US012323047B2

(12) United States Patent
Kolar et al.

(10) Patent No.: US 12,323,047 B2
(45) Date of Patent: Jun. 3, 2025

(54) METHOD OF OPERATING A POWER CONVERTER ARRANGEMENT, CONTROL CIRCUIT AND POWER CONVERTER ARRANGEMENT

(71) Applicant: Infineon Technologies Austria AG, Villach (AU)

(72) Inventors: Johann Walter Kolar, Zurich (CH); Jon Azurza Anderson, Villach (AT); Matthias J. Kasper, Villach (AT); David Menzi, Burgdorf (CH)

(73) Assignee: Infineon Technologies Austria AG, Villach (AT)

( * ) Notice: Subject to any disclaimer, the term of this patent is extended or adjusted under 35 U.S.C. 154(b) by 2 days.

(21) Appl. No.: 17/864,788

(22) Filed: Jul. 14, 2022

(65) Prior Publication Data
US 2023/0047484 A1 Feb. 16, 2023

(30) Foreign Application Priority Data
Aug. 13, 2021 (EP) ..................................... 21191396

(51) Int. Cl.
*H02M 1/12* (2006.01)
*H02M 1/42* (2007.01)

(52) U.S. Cl.
CPC ......... *H02M 1/123* (2021.05); *H02M 1/4216* (2013.01); *H02M 1/4225* (2013.01); *H02M 1/4233* (2013.01)

(58) Field of Classification Search
None
See application file for complete search history.

(56) References Cited

U.S. PATENT DOCUMENTS

| | | | | |
|---|---|---|---|---|
| 4,386,394 | A * | 5/1983 | Kocher | H02M 1/4258 363/67 |
| 8,705,254 | B2 * | 4/2014 | Tan | H02M 1/42 363/69 |
| 10,615,697 | B1 | 4/2020 | Ferrari et al. | |
| 2002/0080632 | A1 | 6/2002 | Haga et al. | |
| 2016/0344214 | A1 | 11/2016 | Petersen et al. | |
| 2020/0007024 | A1 * | 1/2020 | Marwali | H02J 3/26 |
| 2023/0074022 | A1 * | 3/2023 | Zhou | H02M 1/4258 |

OTHER PUBLICATIONS

EP Office Action, EP 21 191 396.7, Dec. 11, 2023, pp. 1-6.
Roland Greul et al., "The Delta-Rectifier: Analysis, Control and Operation" IEEE Transactions on Power Electronics, Institute of Electrical and Electronics Engineers, USA, vol. 21, No. 6, Nov. 1, 2006, pp. 1637-1648, XP011150076.
EP Extended Search Report, EP 21191396, Jan. 8, 2022, pp. 1-8.
(Continued)

*Primary Examiner* — Peter M Novak
(74) *Attorney, Agent, or Firm* — Armis IP Law, LLC

(57) ABSTRACT

A method, a control circuit, and a power converter arrangement are disclosed. The method includes: coupling three power converters (1, 2, 3) with each other; connecting each of the three power converters (1, 2, 3) to a 3-phase power source (4) configured to provide three supply voltages (Ua, Ub, Uc); and regulating a respective input signal (V1, V2, V3; I1, I2, I3) of each of the three power converters (1, 2, 3) dependent on a common mode signal (Scm).

28 Claims, 22 Drawing Sheets

(56) References Cited

OTHER PUBLICATIONS

Kolar, Johann W., et al, "The essence of three-phase PFC rectifier systems", Telecommications Energy Conference (INTELEC), 2011 IEEE 33rd Interntional, IEEE, Oct. 9, 2011, pp. 1-27, XP032071349.
Vermulst B J D et al, "Single-stage three-phase AC to DC conversion with isolation and Bi-directional power flow", IECON 2014—40th Annual Confeerence of the IEEE Industrial Electronics Society, IEEE, Oct. 29, 2014, pp. 4378-4383, XP032739356.

* cited by examiner

METHOD OF OPERATING A POWER CONVERTER ARRANGEMENT, CONTROL CIRCUIT AND POWER CONVERTER ARRANGEMENT

RELATED APPLICATION

This application claims priority to earlier filed European Patent Application Serial Number EP21191396 entitled "METHOD OF OPERATING A POWER CONVERTER ARRANGEMENT, CONTROL CIRCUIT AND POWER CONVERTER ARRANGEMENT," filed on Aug. 13, 2021, the entire teachings of which are incorporated herein by this reference.

TECHNICAL FIELD

This disclosure relates in general to a method of operating a power converter arrangement, a control circuit, and a power converter arrangement. In particular, the disclosure relates to a power converter arrangement configured to receive power from a 3-phase power supply.

BACKGROUND

One type of conventional power converter is a voltage regulator. In general, to maintain an output voltage within a desired range, a controller in the voltage regulator compares the magnitude of a generated output voltage to a setpoint reference voltage. Based on a respective error voltage derived from the comparison, the controller modifies a respective switching frequency and/or pulse width modulation associated with activating one or more switches in the power converter.

BRIEF DESCRIPTION

There is a need for operating such power converter arrangement in an efficient way.

One example relates to a method. The method includes coupling three power converters with each other, connecting each of the three power converters to a 3-phase power source configured to provide three supply voltages, and regulating a respective input signal of each of the three power converters dependent on a common mode signal.

Another example relates to a control circuit. The control circuit is configured to regulate a respective input signal of each of three power converters dependent on a common mode signal, wherein the three power converters are coupled with each other, and wherein each of the three power converters is connected to a 3-phase power source configured to provide three supply voltages.

According to yet another example, a power converter arrangement includes three power converters that are coupled with each other and that are each connected to a 3-phase power source configured to provide three supply voltages, and a control circuit configured to regulate a respective input signal of each of three power converters dependent on a common mode signal.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

DETAILED DESCRIPTION

Figure 1:
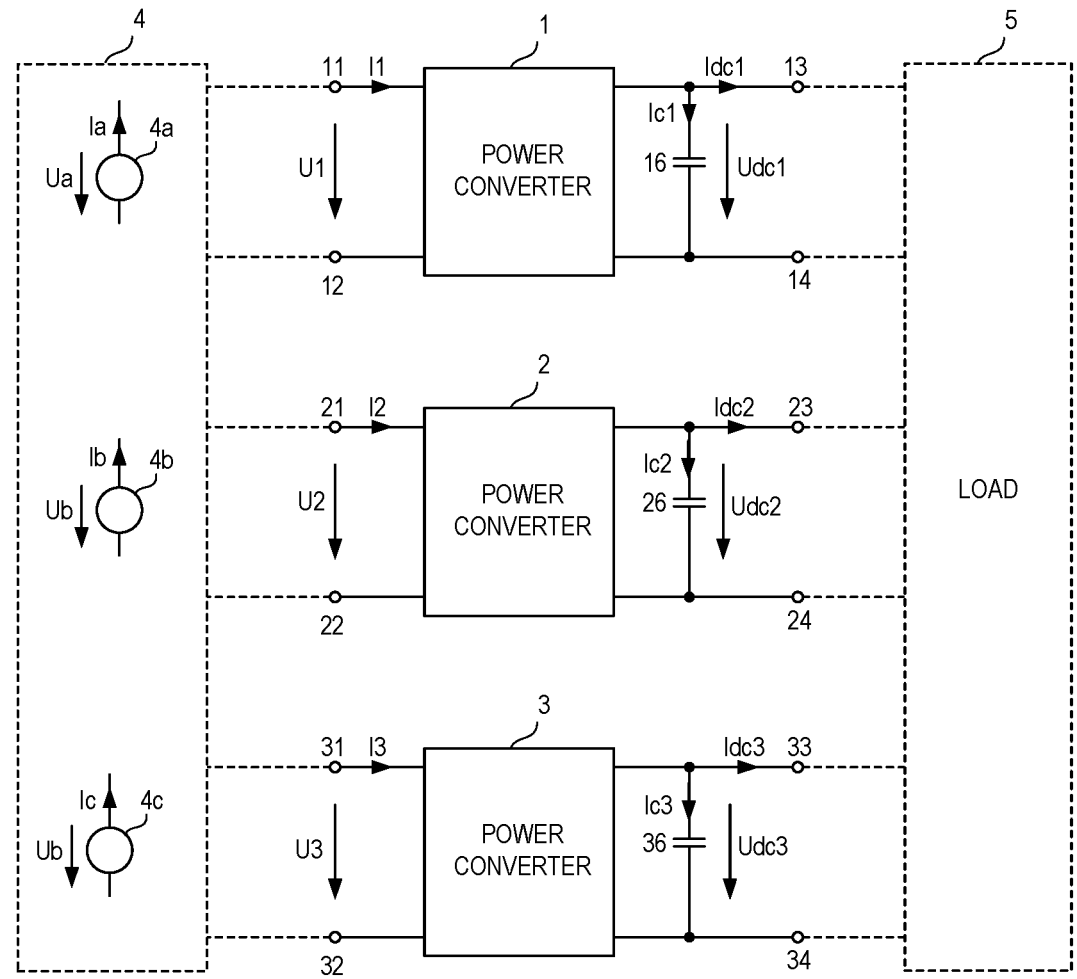
FIG. 1 schematically illustrates one example of a power converter arrangement with three single phase power converters, wherein the power converter arrangement is configured to be coupled to a power supply and a load.

FIG. 1 illustrates one example of a power converter arrangement. The power converter arrangement includes three power converters 1, 2, 3. Each of these power converters 1, 2, 3 includes an input with a first input node 11, 21, 31 and a second input node 12, 22, 32 and is configured to receive a respective input voltage U1, U2, U3 and a respective input current I1, I2, I3 at the input. Furthermore, each of the power converters 1, 2, 3 includes an output with a first output node 13, 23, 33 and a second output node 14, 24, 34 and is configured to provide an output voltage Udc1, Udc2, Udc3 and an output current Idc1, Idc2, Idc3 at the respective output.

The power converters 1, 2, 3 are represented by circuit blocks in the example shown in FIG. 1. A more detailed example of the power converters 1, 2, 3 is explained herein further below. Each of the power converters 1, 2, 3 further includes an output capacitor 16, 26, 36 connected between the first output node 13, 23, 33 and the second output node 14, 24, 34. For illustration purposes, the output capacitors 16, 26, 36 are drawn outside the circuit blocks representing the power converters 1, 2, 3. The output capacitors 16, 26, 36 may also be referred to as DC link capacitors.

The power converter arrangement with the power converters 1, 2, 3 may operate as a 3-phase power converter and may be configured to be connected to a 3-phase power supply 4 (illustrated in dashed lines in FIG. 1). The three-phase power supply 4 is configured to provide three supply voltages Ua, Ub, Uc and three supply currents Ia, Ib, Ic. For this, the power supply may include three single phase power sources 4a, 4b, 4c, a first power source 4a configured to provide a first supply voltage Ua and a first supply current Ia, a second power source 4b configured to provide a second supply voltage Ub and a second supply current Ib, and a third power source 4c configured to provide a third supply voltage Uc and a third supply current Ic. The input voltages U1, U2, U3 and the input currents I1, I2, I3 of the power converters 1, 2, 3 are based on the supply voltages Ua, Ub, Uc and the supply currents Ia, Ib, Ic. This is explained in detail herein further below. Each of the power converters 1, 2, 3 receives one input voltage U1, U2, U3 and one input current I1, I2, I3, so that the power converters 1, 2, 3 may also be referred to as single phase power converters.

Figure 2:
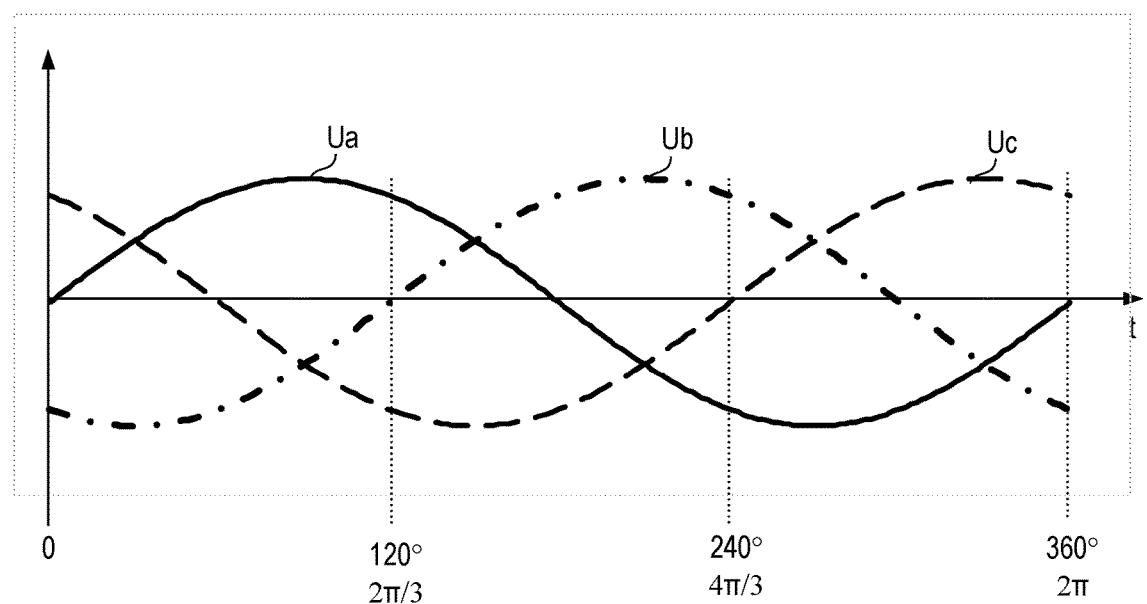
FIG. 2 shows signal diagrams of supply voltages that may be provided by the power supply.

According to one example, the supply voltages Ua, Ub, Uc provided by the 3-phase power supply are alternating voltages, such as sinusoidal voltages, wherein there is a phase shift between each pair of these supply voltages Ua, Ub, Uc. FIG. 2 shows signal diagrams of sinusoidal supply voltages Ua, Ub, Uc during one period of each of these voltages Ua, Ub, Uc. A phase shift between each pair of the supply voltages Ua, Ub, Uc is 120° (=2 π/3) in this example. Each of the supply voltages Ua, Ub, Uc periodically changes between a minimum voltage level and a maximum voltage level, wherein the maximum voltage level is a positive voltage level and the minimum voltage level is a negative voltage level in this example. According to one example, a magnitude of the minimum voltage level essentially equals a magnitude of the maximum voltage level, and the three supply voltages Ua, Ub, Uc have essentially the same minimum and maximum voltage levels. Further, the three supply voltages Ua, Ub, Uc may have essentially the same frequency f, wherein this frequency f is between 50 Hz and 60 Hz, for example.

FIG. 2 illustrates the supply voltages Ua, Ub, Uc dependent on a phase angle over one period. In the time domain, the supply voltages Ua, Ub, Uc according to FIG. 2 are given by $$Ua = \hat{U} \cdot \sin(\omega t + \varphi a) \tag{1a}$$

$$Ub = \hat{U} \cdot \sin(\omega t + \varphi a + 2\pi/3) \tag{1b}$$

$$Uc = \hat{U} \cdot \sin(\omega t + \varphi a + 4\pi/3) \tag{1c},$$

where $\hat{U}$ denotes the amplitude, $\omega = 2\pi f$ is the frequency, and $\varphi a$ is the phase angle of the first supply voltage Ua.

The supply voltages Ua, Ub, Uc are 230 Vrms or 110 Vrms voltages, for example. The amplitude $\hat{U}$ of a 230 Vrms voltage is about 325 V, and the amplitude $\hat{U}$ of a 110 Vrms voltage is about 155 V.

Referring to FIG. 1, the power converter arrangement with the three single phase converters 1, 2, 3 may be configured to provide the output voltages Udc1, Udc2, Udc3 and the output currents Idc1, Idc2, Idc3 to a load 5 (illustrated in dashed lines in FIG. 1). The load 5 may be any kind of load configured to receive the output voltages Udc1, Udc2, Udc3 and output currents Idc1, Idc2, Idc3 from the power converter arrangement. A more detailed example of the load is explained herein further below.

The output voltages Udc1, Udc2, Udc3 of the power converters 1, 2, 3 are direct voltages, for example. Each of these output voltages Udc1, Udc2, Udc3 is available across a respective one of the output capacitors 16, 26, 36. The output voltages Udc1, Udc2, Udc3 may also be referred to as DC link voltages.

During operation of the power converter arrangement, each of the power converters 1, 2, 3 may receive a respective input power Pin1, Pin2, Pin3 from the power supply 4 and provide a respective output power Po1, Po2, Po3 to the load 5. The input power Pin1, Pin2, Pin3 of each power converter 1, 2, 3 is given by the input voltage U1, U2, U3 multiplied with the input current I1, I2, I3 and the output power Po1, Po2, Po3 of each power converter 1, 2, 3 is given by the output voltage Udc1, Udc2, Udc3 multiplied with the output current Idc1, Idc2, Idc3. Furthermore, during operation of the power converter arrangement, the output capacitors 16, 26, 36 may be charged or discharged. Currents Ic1, Ic2, Ic3 that charge or discharge the output capacitors 16, 26, 36 are referred to as capacitor currents in the following. At a given output power Po1, Po2, Po3, the capacitor currents Ic1, Ic2, Ic3 may vary periodically. The capacitor currents Ic1, Ic2, Ic3 may include at least one low frequency component having a frequency that equals the frequency of the respective input voltage Ua, Ub, Uc, or that is a multiple of the frequency of the respective input voltage Ua, Ub, Uc, wherein a multiplication factor is between 2, 3, or 4, for example. In addition to the output capacitors 16, 26, 36 the power converter arrangement may include filter capacitors (not shown) in parallel with the output capacitors that filter high-frequency components of the capacitor currents or output currents. Such high-frequency components of the currents may result from a switched-mode operation of the power converters 1, 2, 3, as outlined herein further below.

Basically, in the power converter arrangement according to FIG. 1, each of the power converters 1, 2, 3 may receive a respective one of the three supply voltages Ua, Ub, Uc and operate as a conventional PFC (power factor correction) converter. A PFC converter is configured to receive an alternating input voltage and is configured to generate a DC link voltage dependent on a DC link voltage reference such that a voltage level of the DC link voltage essentially equals a voltage level as defined by the DC link voltage reference. Furthermore, a PFC converter is configured to regulate both the voltage level of the DC link voltage and the waveform of an input current. Regulating the waveform of the input current may include regulating the waveform such that the waveform of the input current essentially equals the waveform of the input voltage. The input current may be in phase with the input voltage, so that the input current is proportional to the input voltage. Alternatively, there may be a predefined phase shift between the input current and the input voltage.

Figure 3:
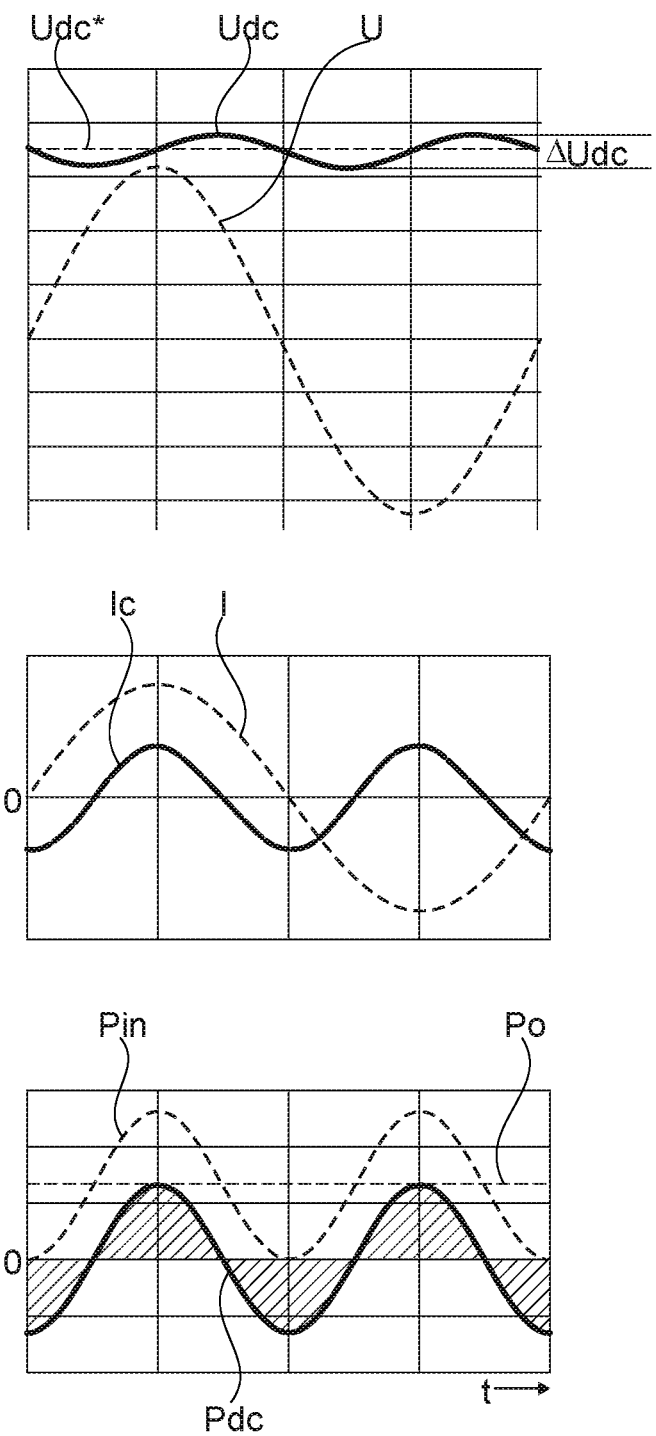
FIG. 3 shows signal diagrams that illustrate one way of operating a conventional (single phase) PFC converter.

The operating principle of a conventional PFC converter that receives a sinusoidal input voltage U is illustrated in FIG. 3. FIG. 3 shows signal waveforms of the input voltage U, a DC link voltage reference Udc*, a DC link voltage Udc, an input current I, a capacitor current Ic, and an input power Pin. Referring to the above, the PFC converter is configured to regulate the input current I such that the input current I has the same waveform as the input voltage U. Thus, the input current I of the PFC converter receiving the sinusoidal input voltage U is a sinusoidal current, and the input power Pin, which is given by the input voltage U multiplied with the input current I, varies over one period of the input voltage U. A frequency at which the input power Pin varies is twice the frequency of the input voltage U or the input current I.

For the purpose of illustration it is assumed that an output power Po (illustrated in dashed lines in FIG. 3) provided by the PFC converter to a load is essentially constant. In this case, the pulsating input power Pin causes a variation of the DC link voltage Udc. Each time the input power Pin is higher than the output power Po the output capacitor is charged by the capacitor current Ic, so that the DC link voltage Udc increases, and each time the input power Pin is lower than the output power Po the output capacitor is discharged by the capacitor current Ic, so that the DC link voltage Udc decreases.

The variation of the DC link voltage Udc can be expressed by a peak-to-peak-voltage ΔUdc, which is the difference between the maximum and the minimum of the DC link voltage within one period of the input voltage U. In the following, ΔE denotes an energy storage requirement, which is the energy that is stored in the output capacitor when the DC link voltage increases from Udc*−0.5·ΔUdc to Udc*+0.5·ΔUdc and that is released from the output capacitor when the DC link voltage decreases from Udc*+0.5·ΔUdc to Udc*−0.5·ΔUdc. This energy storage requirement ΔE is dependent on the peak-to-peak-voltage ΔUdc, a capacitance Cdc of the output capacitor, and the DC link voltage reference Udc* as follows, $$\Delta E = \frac{1}{2} \cdot Cdc \cdot \left[ \left( Udc^* + \frac{\Delta Udc}{2} \right)^2 - \left( Udc^* - \frac{\Delta Udc}{2} \right)^2 \right] = Cdc \cdot Udc^* \cdot \Delta Udc. \quad (2a)$$

Considering equation (2) the peak-to-peak voltage ΔUdc is dependent on the energy storage requirement ΔE, the capacitance Cdc of the output capacitor, and the DC link voltage reference Udc*, as follows, $$\Delta Udc = \frac{\Delta E}{Cdc \cdot Udc^*}. \quad (2b)$$

Basically, it is desirable to achieve a small peak-to-peak voltage ΔUdc in order to have reduced ripples of the DC link voltage Udc. Referring to equation (2b), at a given energy storage requirement ΔE and a given DC link voltage reference Udc*, the peak-to-peak voltage ΔUdc, can be reduced by increasing the capacitance Cdc of the output capacitor. Basically, the larger the capacitance Cdc of the output capacitor, the lower the peak-to-peak voltage ΔUdc.

Large capacitors, however, are bulky and expensive. It is therefore desirable to operate a power converter arrangement of the type shown in FIG. 1 in a PFC mode such that the energy storage requirement ΔE is reduced so that (a) at given capacitances of the output capacitors 16, 26, 36, peak-to-peak voltages of the DC link voltages Udc1, Udc2, Udc3 are reduced, or (b) at given peak-to-peak voltages of the DC link voltages Udc1, Udc2, Udc3, the output capacitors 16, 26, 36 can be implemented with smaller capacitances.

Operating the power converter arrangement in the PFC mode may include that the supply currents Ia, Ib, Ic received (drawn) by the power converter arrangement from the power supply 4 at least approximately have the same waveform as the supply voltages Ua, Ub, Uc. The supply currents Ia, Ib, Ic may be in phase with the supply voltages Ua, Ub, Uc. Alternatively, there is a phase shift between the supply currents Ia, Ib, Ic and the supply voltages Ua, Ub, Uc.

Figure 4:
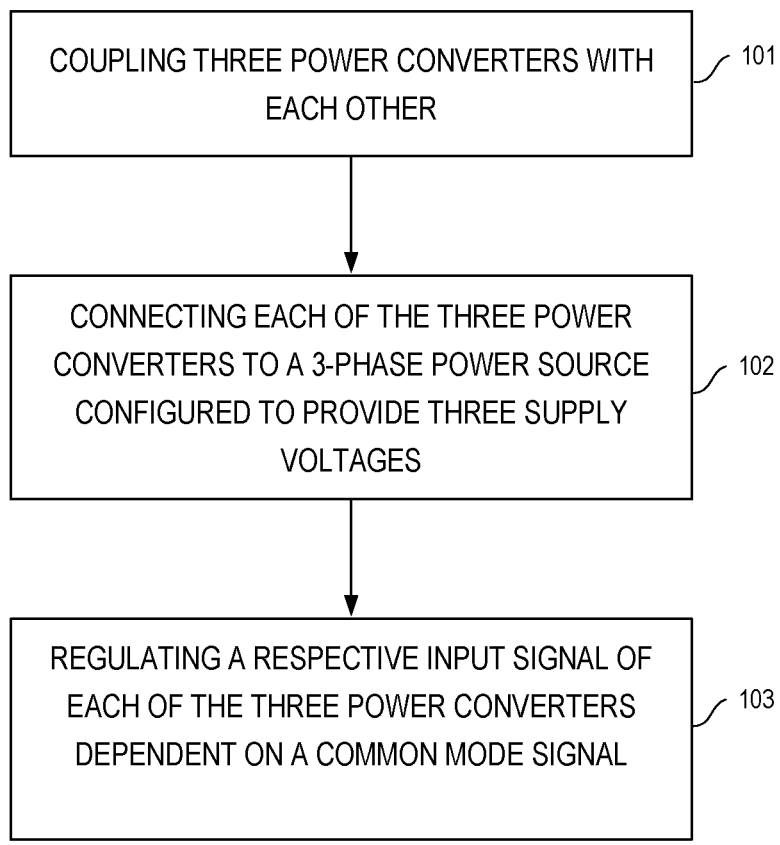
FIG. 4 illustrates one example of a method for operating the power converter arrangement according to FIG. 1.

FIG. 4 schematically illustrates one example of a method for operating a power converter arrangement of the type shown in FIG. 1 in a PFC mode such that reduced ripples of the DC link voltages Udc1, Udc2, Udc3 occur. Referring to FIG. 4, the method includes coupling the three power converters with each other (101), connecting each of the three power converters to a 3-phase power supply that is configured to provide three supply voltages (102), and regulating a respective input signal of each of the three power converters dependent on a common mode signal (103).

Figure 5:
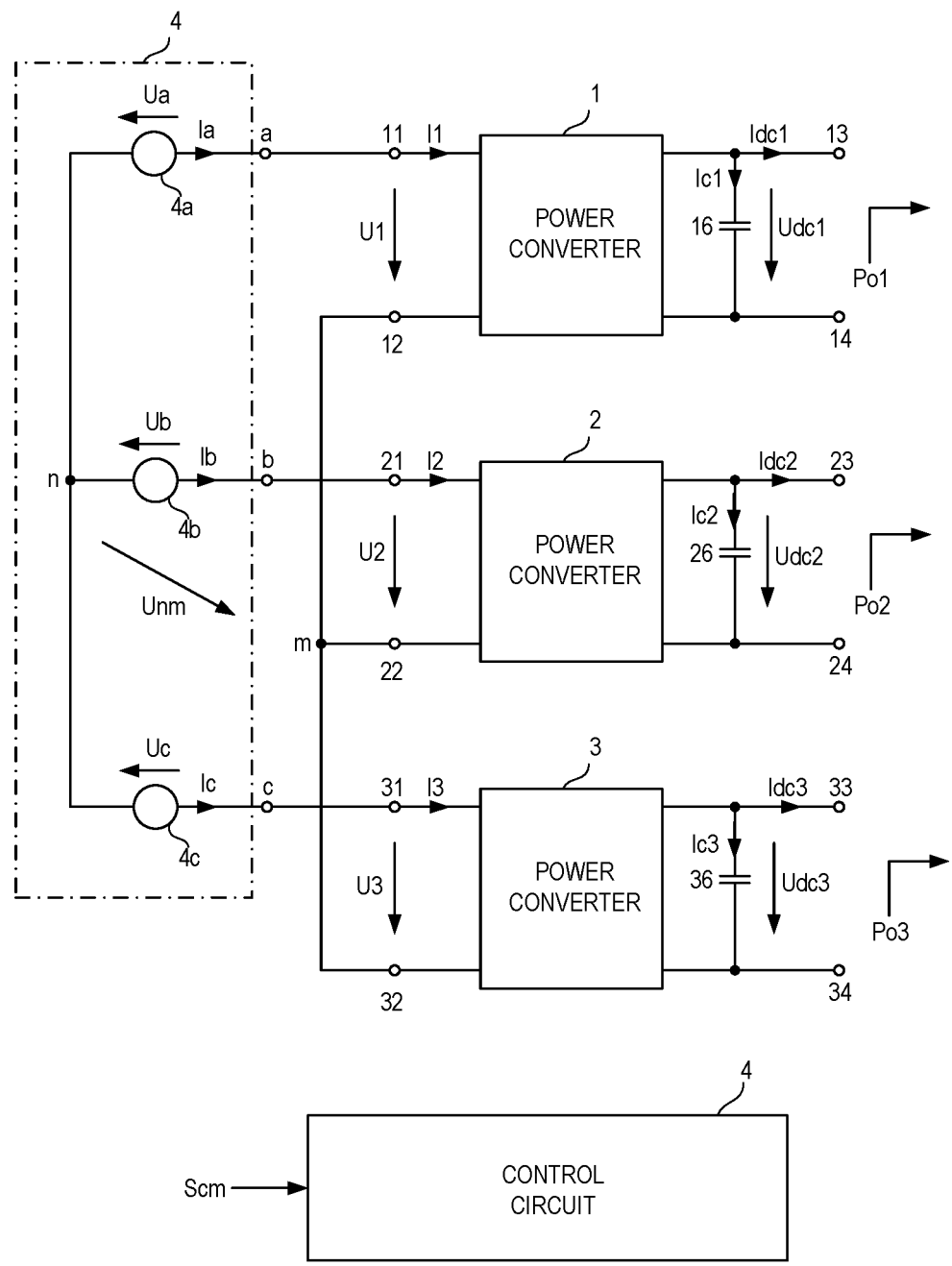
FIG. 5 illustrates the power converter arrangement according to FIG. 1, wherein the single phase power converters are connected in a star configuration.

One example of a method according to FIG. 4 is explained with reference to FIG. 5 in the following. FIG. 5 shows a power converter arrangement of the type according to FIG. 1 in which the three single phase converters 1, 2, 3 are coupled with each other and connected to a 3-phase power supply 4.

In the example shown in FIG. 5, the second input nodes 12, 22, 32 of the power converters 1, 2, 3 are connected with each other at a floating circuit node m in order to couple the power converters 1, 2, 3 with each other. Furthermore, the first input node 11, 21, 31 of each of the power converters 1, 2, 3 is connected to the 3-phase power supply 4. The 3-phase power supply 4 includes a first output node a, a second output node b, and a third output node c, wherein the first output node 11 of the first power converter 1 is connected to the first output node a of the power supply 4, the first output node 21 of the second power converter 2 is connected to the second output node b, and the first input node 31 of the third power converter 3 is connected to the third output node c. Connecting the power converters 1, 2, 3 in this way may be referred to as connecting the power converters 1, 2, 3 in a star configuration.

Furthermore, in the power supply 4, the first power source 4a is connected between the first output node a and a reference node n, the second power source 4b is connected between the second output node b and the reference node n, and the third power source 4c is connected between the third output node c and the reference node n. Thus, the first supply voltage Ua is available between the first output node a and the reference node n, the second supply voltage Ub is available between the second output node b and the reference node n, and the third supply voltage Uc is available between the third output node c and the reference node n. The reference node n is different from the floating circuit node m. A voltage Unm which may occur between the floating circuit node m and the reference n is referred to as common mode voltage in the following.

In the power converter arrangement according to FIG. 5, the input voltages U1, U2, U3 of the power converters 1, 2, 3 are dependent on the supply voltages Ua, Ub, Uc and the common mode voltage Unm as follows:

$$U1 = Ua + Unm \quad (3a)$$

$$U2 = Ub + Unm \quad (3b)$$

$$U3 = Uc + Unm \quad (3c)$$

The common mode voltage Unm is adjusted via a common mode signal Scm received by a control circuit 4, wherein the control circuit 4 is configured to control operation of the power converters 1, 2, 3. According to one example, the common mode signal Scm is configured to adjust the common mode voltage Unm in such a way that the common mode voltage is dependent on the amplitude $\hat{U}$ and the frequency $\omega t$ of the supply voltages Ua, Ub, Uc as follows:

$$Unm = \Sigma_j M_j \cdot \hat{U} \cdot \sin(j \cdot \omega t + \varphi_j + \varphi a) \quad (4a),$$

where $j = 3 + 6 \cdot k$, where k is an integer, where $k \geq 0$, and where $\varphi i$ is a phase shift that is explained herein further below.

Thus, referring to equation (4a), the common mode voltage Unm may be dependent on the $3^{rd}$, $9^{th}$, $15^{th}$, $21^{st}$, ... harmonics of the supply voltage system. The common mode voltage Unm may also be expressed as follows:

$$Unm = M_3 \cdot \hat{U} \cdot \sin(3 \cdot \omega t + \varphi_3 + \varphi a) + M_9 \cdot \hat{U} \cdot \sin(9 \cdot \omega t + \varphi_9 + \varphi a) + M_{15} \cdot \hat{U} \cdot \sin(15 \cdot \omega t + \varphi_{15} + \varphi a) + M_{21} \cdot \hat{U} \cdot \sin(21 \cdot \omega t + \varphi_{21} + \varphi a) + \quad (4b).$$

Adjusting the common mode voltage Unm in this way may help to reduce the energy storage requirement $\Delta E$ of the output capacitor 16, 26, 36 of each of the power converters 1, 2, 3. This is explained with reference to FIG. 6.

Figure 6:
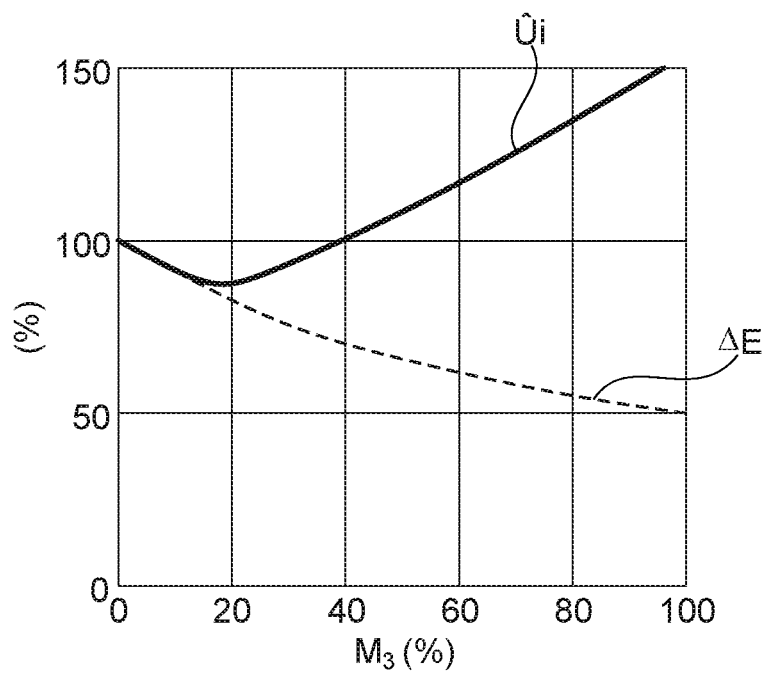
FIG. 6 illustrates energy storage requirements of output capacitors of the power converters and the amplitude of input voltages received by the power converters dependent on a scaling factor of a common mode voltage.

FIG. 6 illustrates the energy storage requirement $\Delta E$ in each power converter 1, 2, 3 of an arrangement shown in FIG. 5 when the common mode voltage Unm is given by $$Unm = M_3 \cdot \hat{U} \cdot \sin(3 \cdot \omega t + \varphi_3 + \varphi a) \quad (5).$$

Thus, in this example, the common mode voltage Unm is only dependent on the third harmonic of the supply voltages Ua, Ub, Uc. FIG. 6 illustrates the energy storage requirement $\Delta E$ dependent on a scaling factor $M_3$, wherein the scaling factor $M_3$ defines the amplitude of the common mode voltage Unm relative to the amplitudes of the supply voltages Ua, Ub, Uc. The operating scenario in which the scaling factor is zero, $M_3 = 0$ (0%), represents the conventional scenario in which the common mode voltage Unm is zero, so that each of the power converters 1, 2, 3 receives a respective one of the supply voltages Ua, Ub, Uc. Furthermore, an operating scenario in which the scaling factor is one, $M_3 = 1$ (100%), represents a scenario in which the amplitude of the common mode voltage Unm equals the amplitude of the supply voltages Ua, Ub, Uc. Furthermore, FIG. 6 illustrates the energy storage requirement $\Delta E$ relative to the energy storage requirement in the conventional scenario ($M_3 = 0$).

As can be seen from FIG. 6, increasing the amplitude of the common mode voltage Unm, that is, increasing the scaling factor $M_3$, results in a reduction of the energy storage requirement $\Delta E$. When the amplitude of the common mode voltage Unm equals the amplitude of the supply voltages Ua, Ub, Uc ($M_3 = 1$), for example, the energy storage requirement $\Delta E$ is only 50% of the energy storage requirement $\Delta E$ in the conventional scenario ($M_3 = 0$).

Referring to FIG. 6, increasing the amplitude of the common mode voltage Unm may also increase an amplitude $\hat{U}i$ of the input voltages U1, U2, U3, wherein $\hat{U}i$ in FIG. 6 represents the amplitude of an arbitrary one Ui of the input voltages U1, U2, U3.

Figure 7:
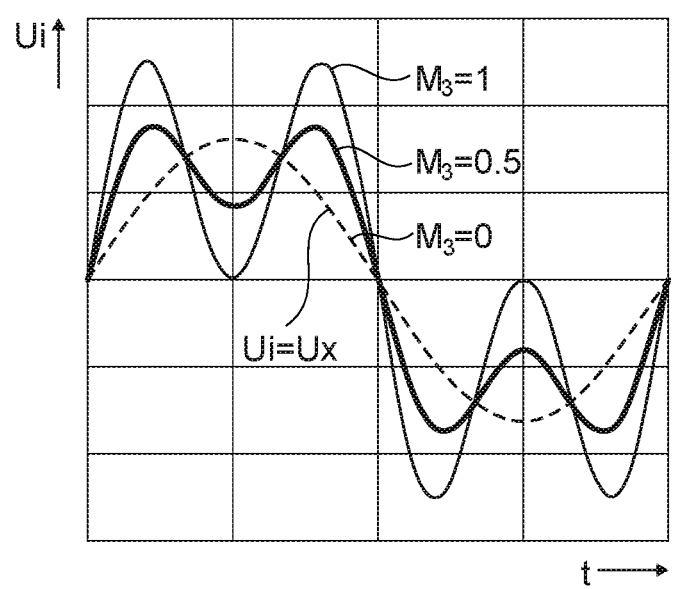
FIG. 7 shows signal diagrams of the input voltages dependent on different scaling factors.

An increase of the amplitude $\hat{U}i$ of the input voltage Ui dependent on the scaling factor $M_3$ is also illustrated in FIG. 7, which shows signal diagrams of the input voltage Ui at different scaling factors $M_3$ over one period of the associated supply voltage Ux. In the following, Ux denotes the supply voltage that is associated with the input voltage Ui in such a way that Ui = Ux − Unm. Referring to FIG. 5 and equations (3a)-(3c), supply voltage Ua is associated with input voltage U1, supply voltage Ub is associated with input voltage U2, and supply voltage Uc is associated with input voltage U3. FIG. 7 illustrates the input voltage Ui at $M_3 = 0$ (0%), at $M_3 = 0.5$ (50%), and at $M_3 = 1$ (100%), wherein $M_3 = 0$ represents the conventional scenario in which the input voltage U1 equals the associated supply voltage Ux.

Figure 8:
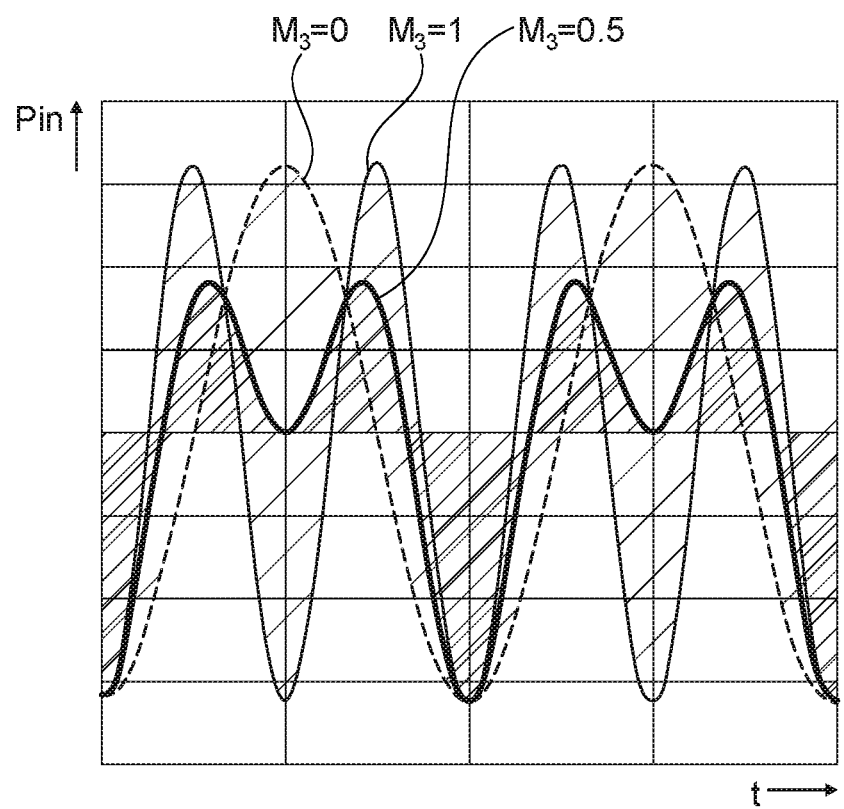
FIG. 8 illustrates input powers of the power converters dependent on different scaling factors of the common mode voltage.

FIG. 8 illustrates the pulsating input power Pin at scaling factors $M_3 = 0$, $M_3 = 0.5$, and $M_3 = 1$. As can be seen, at $M_3 = 0.5$ there are time periods in which the input power varies less than the input power in the conventional scenario ($M_3 = 0$), so that the energy storage requirement $\Delta E$ is reduced. At $M_3 = 1$ an amplitude of the varying input power is essentially the same as the amplitude of the varying input power in the conventional case. However, the frequency is about twice the frequency as in the conventional case, which also results in a reduction of the energy storage requirement $\Delta E$.

Referring to FIG. 6, there is a certain range of the scaling factor $M_3$ that causes the amplitude $\hat{U}i$ of the input voltage Ui to be lower than in the conventional scenario. In the example shown in FIG. 6, this range is between $M_3 = 0$ and about $M_3 = 0.4$, wherein the amplitude of the input voltage Ui reaches a minimum when the scaling factor $M_3$ is about 0.16 (16%). Selecting $M_3$ from this range has the effect that the input voltages U1, U2, U3 have a lower amplitude than the supply voltages Ua, Ub, Uc.

Figure 9:
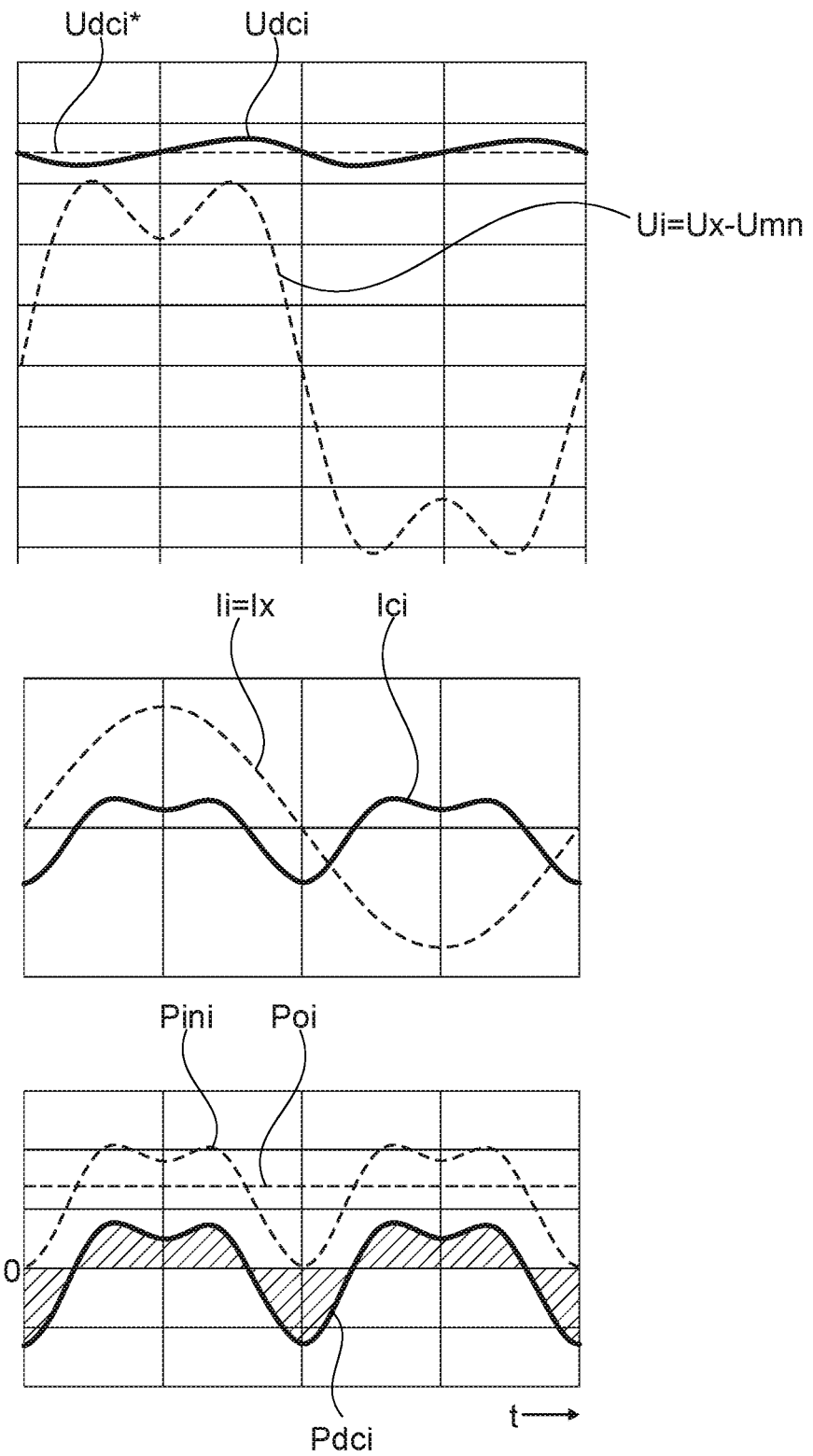
FIG. 9 shows signal diagrams that illustrates one way of operating one of the power converters.

FIG. 9 shows signal diagrams of the input voltage, the input current, the DC link voltage reference, the DC link voltage, the input power, and the output power of one of the power converters 1, 2, 3. In FIG. 9, U1 denotes the input voltage, which is an arbitrary one of the input voltages U1, U2, U3; Ii denotes the associated input current; Udci* denotes the DC link voltage reference of the power converter receiving the input voltage Ui; Udci denotes the DC link voltage that is generated based on the DC link voltage reference Udc*; Ici denotes the capacitor current of the power converter receiving the input voltage Ui; Pini denotes the input power, which is given by the input voltage Ui multiplied with the input current Ii; and Poi denotes the output power received from the power converter by a load.

Referring to equations (3a)-(3c), the input voltage U1, U2, U3 of each power converter 1, 2, 3, by suitably controlling operation of the respective power converter 1, 2, 3, is adjusted such that the input voltage U1, U2, U3 equals the respective supply voltage Ua, Ub, Uc plus the common mode voltage Unm. Referring to the above, Ux denotes the supply voltage that is associated with the input voltage Ui in such a way that Ui=Ux−Unm.

As can be seen from FIG. 9, controlling the input voltage U1 of each power converter dependent on the common mode signal (the common mode voltage) in an arrangement with coupled power converters may help to reduce the peak of the input voltage U1 as compared to the respective supply voltage Ux. Thus, as the product of the input voltage Ui with the input current Ii is lower, a peak of the input power Pin is lower than the input power in a conventional PFC converter. This has the effect that the capacitor current Ici has a lower peak, which has the effect that lower ripples of the DC link voltage Udci occur. In other words, a smaller capacitance of the DC link capacitor is sufficient to buffer a difference between the pulsating input power Pin received by the power converter and the constant output power Po drawn from the power converter by a load.

Referring to the above, energy is stored in the output capacitor 16, 26, 36 of each power converter 1, 2, 3 when the input power received by the respective power converter 1, 2, 3, is higher than the output power, and energy is drawn from the output capacitor 16, 26, 36 when the input power is lower than the output power. In FIG. 9, Pdci illustrates the power flow into the capacitor or from the capacitor. Due to the reduced deviation of the input power Pini from the output power Poi the energy that is stored in the respective output capacitor is lower than in the conventional case illustrated in FIG. 3.

Usually, a PFC converter operates as a boost converter, so that the minimum voltage level of DC link voltage that can be generated is given by the amplitude (the peak) of the received input voltage. Referring to FIG. 6, controlling the input voltage Ui dependent on the common mode voltage Unm may reduce the amplitude (the peak) of the input voltage Ui. Thus, as compared to a conventional PFC converter, each of the power converters 1, 2, 3 according to FIG. 5 can generate a respective DC link voltage Udc1, Udc2, Udc3 that has a minimum voltage level that is lower than the amplitude of the supply voltages Ua, Ub, Uc.

Figure 10:
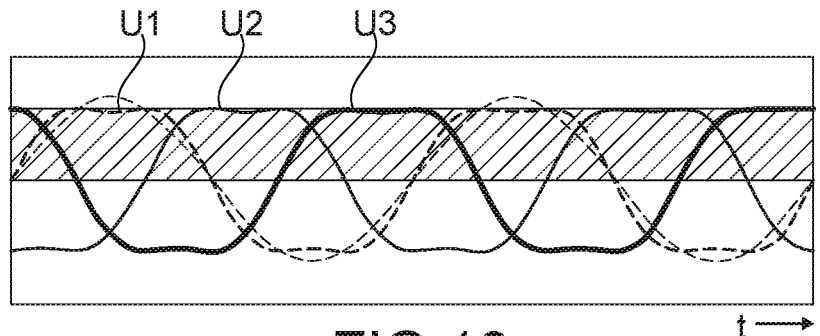
FIG. 10 shows signal diagrams of input voltages received by the power converters of the power converter arrangement according to FIG. 5.

FIG. 10 shows signal diagrams of the input voltages U1, U2, U3 and of the first supply voltage Ua over several periods of the supply voltages and the input voltages U1, U2, U3 in a power converter arrangement according to FIG. 5 in which the common mode voltage is in accordance with equation (5) and the scaling factor is selected such that the amplitudes of the input voltages are lower than the amplitudes of the supply voltages Ua, Ub, Uc. As can be seen, the peak voltages of the input voltages U1, U2, U3 are lower than the peak voltages of the supply voltages Ua, Ub, Uc (wherein only the first supply voltage Ua is illustrated in FIG. 10). When the common mode voltage Unm is adjusted in accordance with equation (5) and $M_3$=0.16 (16%), for example, the voltage peak of the input voltages U1, U2, U3 is about 282 V when the supply voltages Ua, Ub, Uc are 230 Vrms voltages. Amplitudes (peaks) of the supply voltages Ua, Ub, Uc are about 325 V.

Referring to the above, by suitably adjusting the common mode voltage Unm the energy storage requirement ΔE can be reduced, wherein the reduced the energy storage requirement ΔE may be beneficial in various ways. This is explained with reference to FIGS. 11A-11C, 12A-12C, 13-13C, and 14A-14B in the following.

Each of these Figures shows signal diagrams of the input voltage U1 of one of the power converters 1, 2, 3, the respective DC link voltage reference Udci* and the (varying) DC link voltage Udci. For the ease of illustration, a rectified version of the input voltage U1 is illustrated. Each of these figures is based on simulations of a power converter arrangement with a maximum overall output power of 22 kW, so that the output power of each of the power converters 1, 2, 3 is about 6.6 kW. The supply voltages Ua, Ub, Uc are 230 Vrms voltages in this example. Implementing the power converter arrangement in this way, however, is only an example. The beneficial aspects explained with reference to FIGS. 11A-11B, 12A-12C, 13A-13C and 14A-14B are available in a power converter arrangement having a different maximum output power and receiving different supply voltages as well.

Figure 11A:
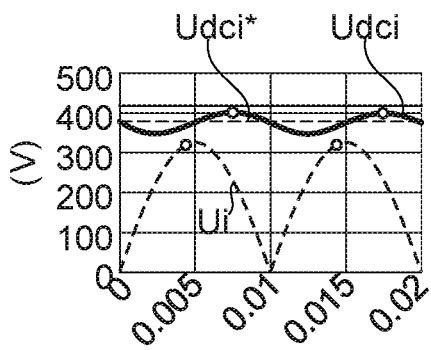
FIGS. 11A-11C, 12A-12C, 13-13C, 14-14B show signal diagrams of various signals in one of the single phase power converters dependent on the scaling factor and/or a phase of the common mode voltage.
Figure 11B:
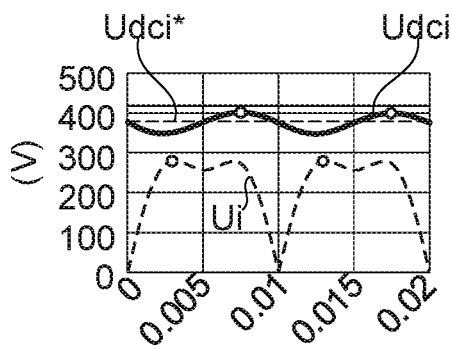
Figure 11C:
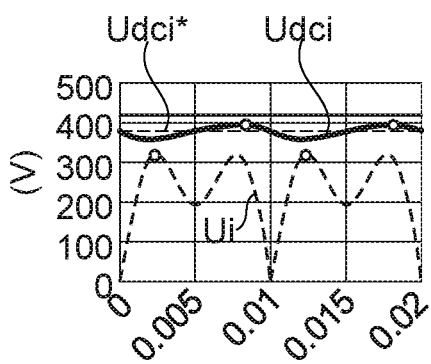

FIGS. 11A-11C illustrate a reduction of the peak-to-peak voltage ΔUdc that can be achieved by suitably adjusting the common mode voltage Unm. In each of these examples, the common mode voltage is in accordance with equation (5) and only includes the third harmonic. FIG. 11A illustrates the conventional case ($M_3$=0), wherein the DC link voltage reference Udci* is 390 V and the peak-to-peak voltage is about 55 V. FIG. 11B illustrates an operating scenario in which $M_3$=0.2 (20%). In this example, the peak-to-peak voltage is only about 44 V, which is a reduction of about 17% as compared to the conventional operating scenario illustrated in FIG. 11A. In the example shown in FIG. 11C, $M_3$=0.4 (40%). In this example, the peak-to-peak voltage is about 38 V, which is a reduction of about 30% as compared to the conventional scenario.

Figure 12A:
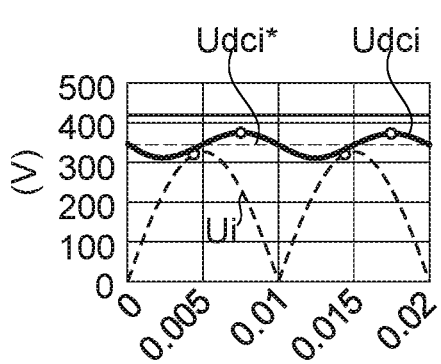
Figure 12B:
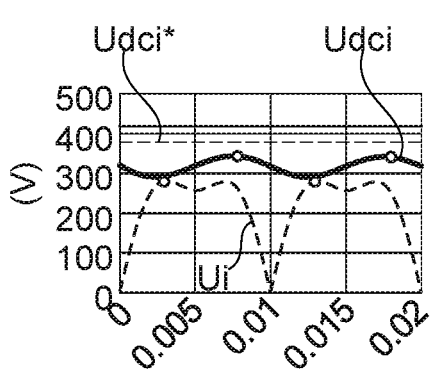

FIG. 12A illustrates a conventional operating scenario ($M_3$=0), wherein the DC link voltage reference Udci* is about 340 V, which is lower than in the example illustrated in FIGS. 11A-11C, and the peak-to-peak voltage is about 61 V. In the example shown in FIG. 12B, $M_3$=0.2 (20%). In this example, the (minimum possible) DC link voltage reference Udci* is only about 310 V which is a reduction of about 9% as compared to the conventional scenario. At the same time, the peak-to-peak voltage is only about 55 V, which is a reduction of about 10% as compared to the conventional scenario illustrated in FIG. 12A.

Figure 12C:
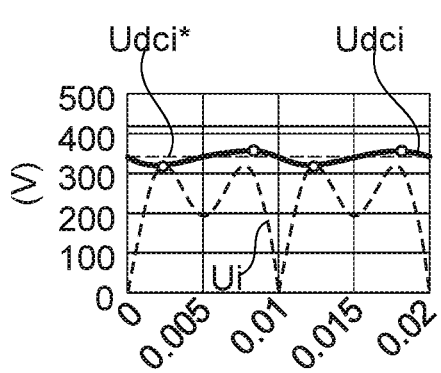

FIG. 12C illustrates an example in which $M_3$=0.4 (40%). In this example, the minimum possible DC link voltage reference is about 340 V which is the same as in the conventional scenario illustrated in FIG. 12A. The peak-to-peak voltage, however, is only about 43 V, which is a reduction of about 30% as compared to the conventional scenario illustrated in FIG. 12A.

Figure 13A:
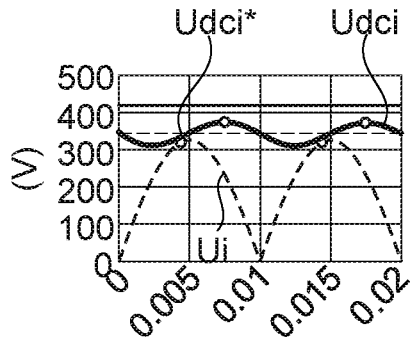
Figure 13B:
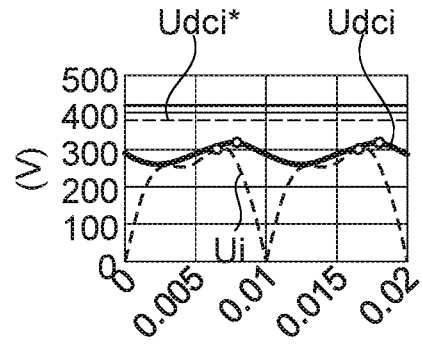

In addition to the scaling factor $M_3$ the phase angle $\varphi_3$ of the common mode voltage can be varied. This is explained with reference to FIGS. 13A-13C. FIG. 13A illustrates the conventional scenario, that is, both the scaling factor $M_3$ and the phase angle $\varphi_3$ are zero. In this example, the DC link voltage reference is about 340 V and the peak-to-peak voltage is about 61 V. In the example shown in FIG. 13B, the scaling factor $M_3$=0.2 (20%) and the phase angle is 23°. In this example, the amplitude of the input voltage is reduced as compared to the conventional scenario illustrated in FIG. 13A, so that the minimum DC link voltage reference Udci* can be reduced to about 290 V, which is a reduction of about 15% as compared to the conventional scenario illustrated in FIG. 13A. At the same time, the peak-to-peak voltage is reduced to about 60 V, which is a reduction of about 2% as compared to the conventional scenario.

Figure 13C:
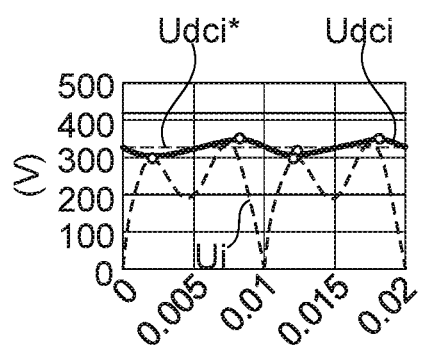

In the example shown in FIG. 13C, the scaling factor $M_3$=0.4 (40%) and the phase angle $\varphi_3$ is 14°. In this example, the minimum DC link voltage reference can be reduced to about 330 V, which is a reduction of about 3% as compared to the conventional scenario, and the peak-to-peak voltage is only 44 V, which is a reduction of about 28% as compared to the conventional scenario.

As can be seen from FIGS. 11A-11C, 12A-12C and 13A-13C, by suitably selecting the scaling factor $M_3$ and/or the phase angle $\varphi_3$ at least one of the peak-to-peak voltage and the minimum DC link voltage reference can be reduced as compared to the conventional operating scenario.

Figure 14A:
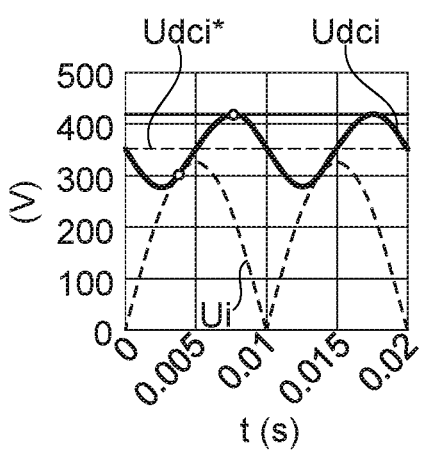
Figure 14B:
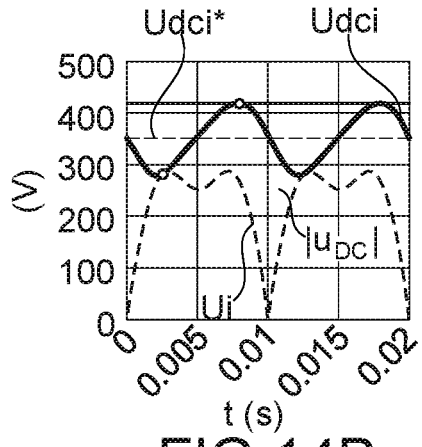

Alternatively, at a given peak-to-peak voltage, the output capacitance can be reduced. This is illustrated in FIGS. 14A and 14B. FIG. 14A illustrates a conventional operating scenario at a given peak-to-peak voltage. In this specific example, the output capacitance is 413 µF. FIG. 14B illustrates signal diagrams when the scaling factor $M_3$=0.23 (23%). In this example, at the same peak-to-peak voltage as in the conventional case illustrated in FIG. 14A, the output capacitance can be reduced to 339 µF which is a reduction of about 19% as compared to the conventional scenario.

Figure 16:
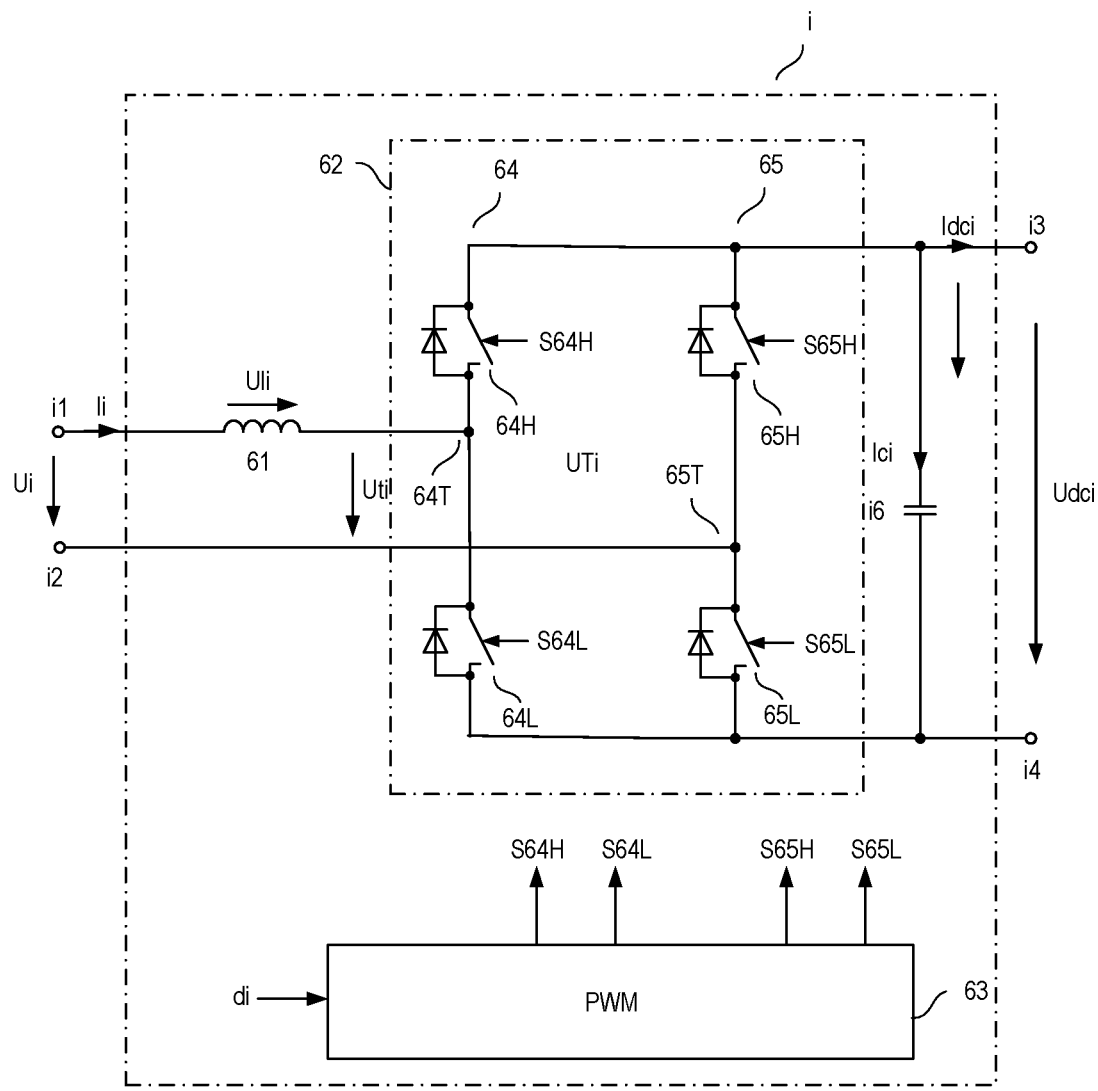
FIG. 16 shows one example of one single phase power converter in greater detail.

FIG. 16 illustrates one example for implementing the power converters 1, 2, 3. In FIG. 16, reference character i denotes an arbitrary one of the power converters 1, 2, 3, i1 denotes the respective first input node, i2 denotes the respective second input node, U1 denotes the respective input voltage, Ii denotes the respective input current, i3 denotes the respective first output node, i4 denotes the respective second output node, Idci denotes the respective output current, Ici denotes the respective capacitor current, and i6 denotes the respective output capacitor.

Figure 15:
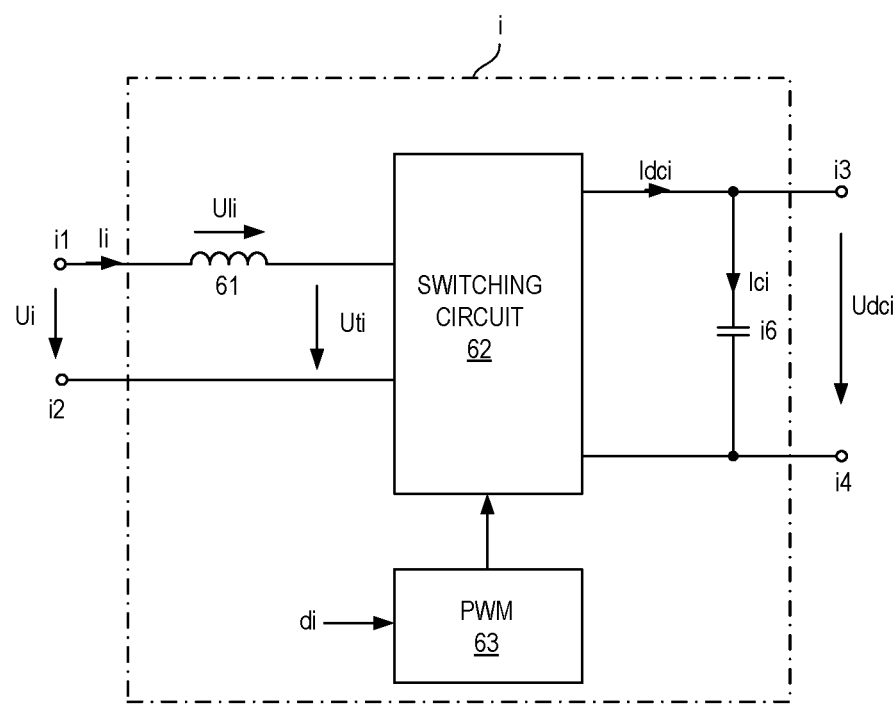
FIG. 15 illustrates a block diagram of one example of one single phase power converter.

Referring to FIG. 15, in addition to the output capacitor i6, the power converter i includes an inductor 61 coupled to the input i1, i2, a switching circuit 62 coupled between the inductor 61 and the output i3, i4, and a PWM (pulse-width modulation) circuit 63 configured to control operation of the switching circuit 62. According to one example, the PWM circuit 63 is configured to control operation of the switching circuit 62 dependent on a duty-cycle signal di received by the control circuit 63.

Referring to the above, the inductor 61 is "coupled" to the input i1, i2. This may include that the inductor 61 is directly connected to the input i1, i2, as illustrated in FIG. 15, or may include that additional circuitry (not shown in FIG. 15), such as a rectifier, is connected between the input i1, i2 and the inductor 61. This is explained with reference to an example herein further below.

According to an example, operating the power converter i includes regulating the input current Ii dependent on an input current reference. Regulating the input current Ii may include regulating an inductor voltage Uli, which is a voltage across the inductor 6, and regulating the inductor voltage Uli may include regulating a switch node voltage Uti. The switch node voltage Uti is a voltage between input nodes of the switching circuit 62. "Input nodes" of the switching circuit 62 are circuit nodes that connect the switching circuit 62 to the inductor 61 and one of the input nodes i1, i2. Just for the purpose of illustration, in the example shown on FIG. 8, the inductor 61 is connected between the first input node i1 of the power converter i and a first input node of the switching circuit 62, and a second input node input of the switching circuit 62 is connected to the second input node i2 of the power converter i.

According to one example, the switching circuit 62 is configured to generate the switch node voltage Uti dependent on the DC link voltage Udci and the duty cycle signal di. The PWM circuit 63 may operate the switching circuit 62 in a plurality of successive drive cycles such that an average $Uti_{AVG}$ of the switch node voltage Uti in each drive cycle is dependent on the DC link voltage Udci and the duty cycle signal di. This is explained in detail herein further below.

FIG. 16 shows one example of the switching circuit 62 in greater detail. In this example, the switching circuit includes a first half-bridge 64 with a high-side switch 64H and a low-side switch 64L. The high-side switch 64H and the low-side switch 64L of the first half-bridge 64 are connected in series between the output nodes i3, i4. A tap 64T, which is a circuit node at which the high-side switch 64H and the low-side switch 64L of the first half-bridge 64 are connected, forms one of the input nodes of the switching circuits 62 and is connected to the inductor 6 at a circuit node facing away from the first input node i1.

Referring to FIG. 16, the switching circuit further includes a second half-bridge 65 with a high-side switch 65H and a low-side switch 65L that are connected at a tap 65T. The high-side switch 65H and the low-side switch 65L of the second half-bridge 65 are also connected between the output nodes i3, i4. The tap 65T forms a second input node of the switching circuit 62 and is connected to the second input node i2. Connecting the inductor 6 between the first input node i1 and the tap 64T of the first half-bridge 64 and connecting the tap 65T of the second half-bridge 65 to the second input node i2, as illustrated in FIG. 16, is only an example. It is also possible to connect the inductor 6 between the second input node i2 and the tap 65T of the second half-bridge 65 and to directly connect the first input node i1 to the tap 64T of the first half-bridge 64. In each case, the inductor 61 and the switching circuit 62 form a boost converter with a Totem pole topology.

The high-side switches 64H, 65H and the low-side switches 64L, 65L of the half-bridges 64, 65 are switched on and off dependent on a respective drive signal S64H, S65H, S64L, S65L received from the PWM circuit 63. The switches 64H, 65H, 64L, 65L of the first and second half-bridges 64, 65 may include conventional electronic switching elements, such as MOSFETs (Metal Oxide Semiconductor Field-Effect Transistors), IGBTs (Insulated Gate Bipolar Transistors), HEMTs (High Electron-Mobility Transistors), or the like. Furthermore, a free-wheeling element (represented as a diode in FIG. 9) may be connected in parallel with the respective switching element. In the event that an electronic switch includes a MOSFETs, for example, the corresponding free-wheeling element may be implemented by an integrated body diode of the MOSFETs. This, however, is only example. It is also possible to implement each free-wheeling element as a discrete element in addition to the respective switching element.

Different types of electronic switches may be used to implement the high-side switch 64H and the low-side switch 64L of the first half-bridge 64 and the high-side switch 65H and the low-side switch 65L of the second half-bridge 65. According to one example, the switches 64H, 64L of the first half-bridge are optimized to have low switching losses, wherein the switches 65H, 65L of the second half-bridge 65 may be optimized to have low conduction losses.

It be should be noted that each of the switches 65L, 65H of the second half-bridge may be replaced by a respective diode, wherein these diodes are connected in the same way as the freewheeling diodes shown in FIG. 16.

Figure 17A:
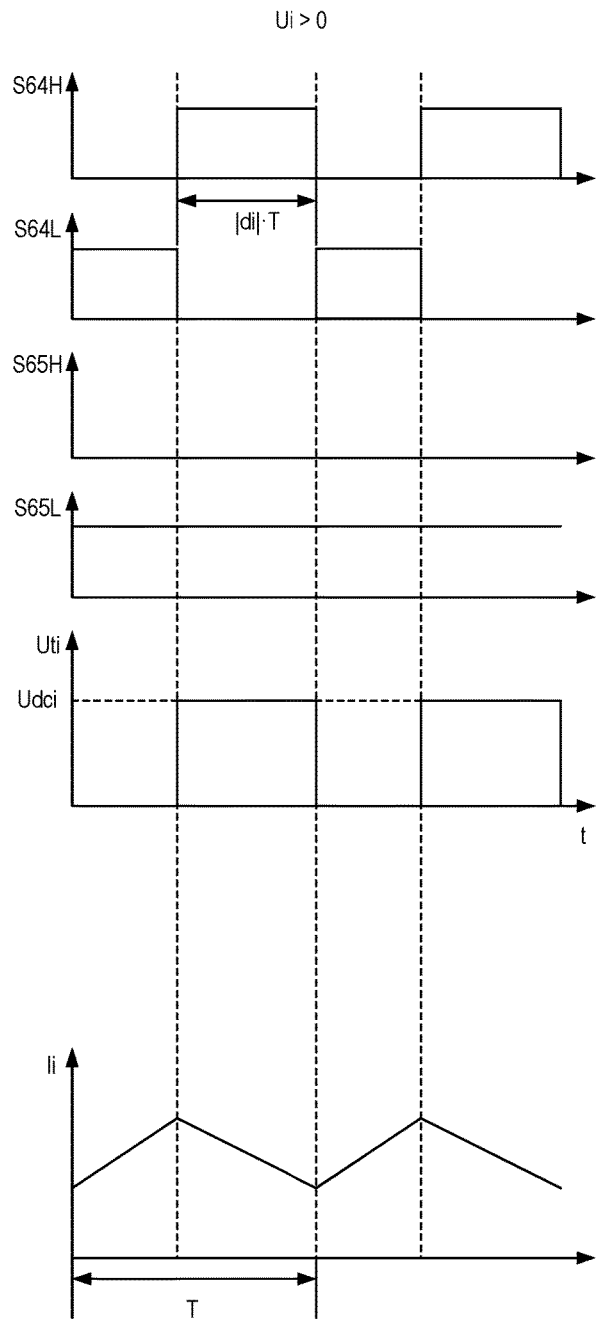
FIGS. 17A-17B show signal diagrams that illustrate one way of operating the power converter according to FIG. 16.
Figure 17B:
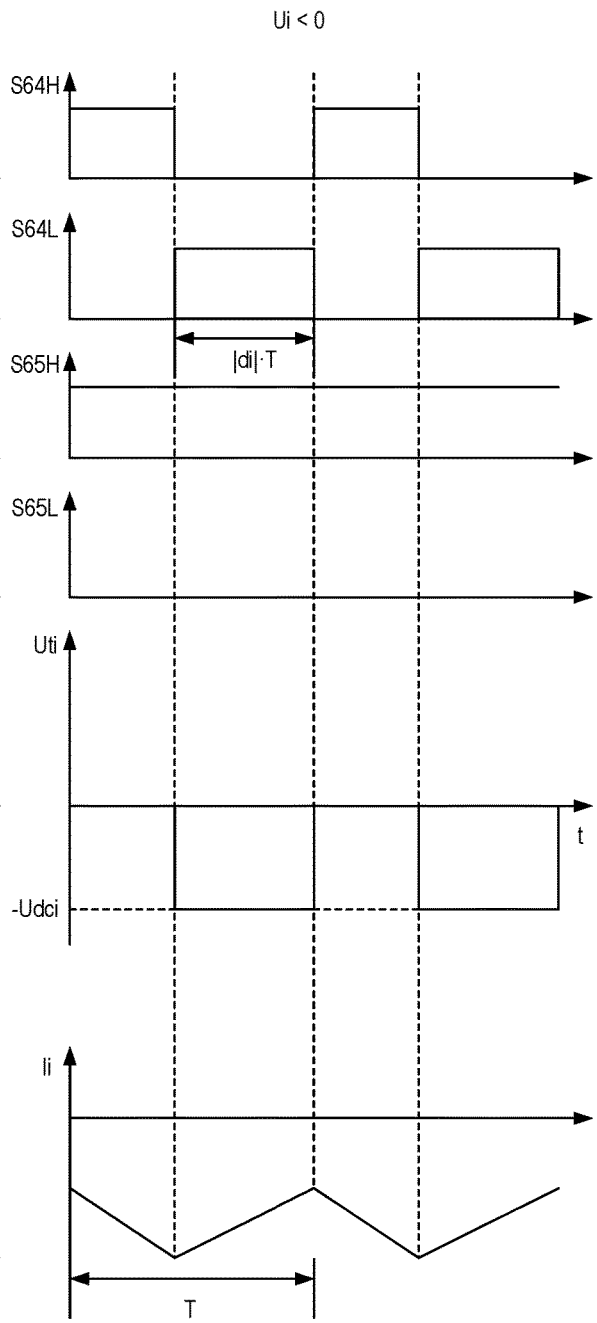

FIGS. 17A and 17B show signal diagrams that illustrate one way of operating the switching circuit 62. More specifically, each of FIGS. 17A and 17B shows signal diagrams of the drive signals S64H, S64L, S65H, S65L received by the switches 64H, 64L, 65H, 65L of the first and second half-bridges 64, 65, the switch node voltage Uti, and the input current Ii. FIG. 17A shows the drive signals S64H, S64L, S65H, S65L, the switch node voltage Uti, and the input current Ii when the input voltage U1 is positive, and FIG. 17B shows the drive signals S64H, S64L, S65H, S65L, the switch node voltage Uti, and the input current Ii when the input voltage U1 is negative. Each of the drive signals S64H, S64L, S65H, S65L either has an on-level that switches on the respective switch 64H, 64L, 65H, 65L, or an off-level that switches off the respective switch 64H, 64L, 65H, 65L. Just for the purpose of illustration in the signal diagrams according to FIGS. 10A and 10B, a high signal level (an upper signal level) represents the on-level and a low signal level represents the off-level.

Referring to FIG. 17A, the PWM circuit 63 is configured to control operation of the switching circuit 62 such that the PWM circuit 63 switches on the low-side switch 65L of the second half-bridge 65 and switches off the high-side switch 65H of the second half-bridge throughout the time period in which the input voltage U1 is positive. Furthermore, referring to FIG. 17B, throughout those time periods in which the input voltage U1 is negative, the PWM circuit 65 switches on the high-side switch 65H and switches off the low-side switch 65L. The frequency of the input voltage U1 essentially equals the frequency of the supply voltages Ua, Ub, Uc, so that the switching frequency of the switches 65H, 65L of the second half-bridge 65 essentially equals the frequency of the supply voltages Ua, Ub, Uc, which is 50 Hz or 60 Hz, for example.

According to one example, the duty-cycle signal di can be positive or negative, wherein one of the two different signs of the duty-cycle signal di indicates that the input voltage Ui is positive and the other one of the two signs indicates that the input voltage U1 is negative. In this example, the PWM circuit 63 controls operation of the high-side switch 65H and the low-side switch 65L of the second half-bridge 65 dependent on the sign of the duty-cycle signal di.

Furthermore, the PWM circuit 65 operates the high-side switch 64H and the low-side switch 64L of the first half-bridge 64 in a PWM fashion in order to control the input current Ii, which is the current through the inductor 6. The switches 64H, 64L of the first half-bridge 64 are operated at a switching frequency that is significantly higher than the frequency of the supply voltages Ua, Ub, Uc. According to one example, the switching frequency f of the first half-bridge 64 is higher than 10 kHz or even higher than 100 kHz. The first half-bridge 64 is operated in successive drive cycles, wherein in each drive cycle there is a time period in which the inductor 6 receives energy from the input i1, i2, and a time period in which the inductor 6 transfers energy to the output i3, i4. In each of these drive cycles, one of the high-side switch 64H and the low-side switch 64L acts as a control switch that controls the time period in which the inductor 6 receives energy from the input i1, i2, and the other one of the high-side switch 64H and the low-side switch 64L acts as a synchronous rectifier that transfers the energy from the inductor 6 to the output i3, i4.

According to one example, a magnitude of the duty-cycle signal di defines the duration of the time period in each drive cycle for which the control switch is switched on. According to one example, the magnitude of the duty-cycle signal di is between 0 and 1. If, for example, the magnitude of the duty-cycle signal is 0.5 (50%) the control switch is switched on during 50% of the duration of one drive cycle and the synchronous rectifier switch is switched on for the remainder of the drive cycle. According to one example, the PWM circuit 63 operates the first half-bridge 64 such that the successive drive cycles have the same duration. This kind of operation may be referred to as fixed frequency operation. A duration T of each drive cycle is given by the reciprocal of switching frequency, T=1/f, in this example.

In order to avoid cross currents in the second half-bridge 65 there may be dead times between switching off one of the low-side switch 65L and the high-side switch 65H and switching on the other one of the low-side switch 65L and the high-side switch 65H. During the dead times, each of the low-side switch 65L and the high-side switch 65H is switched off, so that current may flow via one of the freewheeling elements. For the ease of illustration, dead times are not illustrated in FIGS. 17A and 17B.

In the power converter i according to FIG. 16, when the input voltage U1 is positive, the low-side switch 64L may act as the control switch and the high-side switch 64H may act as the synchronous rectifier. Equivalently, when the input voltage U1 is negative, the high-side switch 64H may act as the control switch and the low-side switch 64L may act as the synchronous rectifier. In each case, a magnitude of the input current Ii increases during those time periods in which the respective control switch is switched on and decreases during those time periods in which the respective synchronous rectifier is switched on.

Referring to FIGS. 17A and 17B, the switch node voltage Uti is essentially zero when the control respective control switch is switched on. Furthermore, the switch node voltage Uti essentially equals the DC link voltage Udci when the synchronous rectifier is switched on and the input voltage U1 is positive, and essentially equals the inverse DC link voltage −Udci when the synchronous rectifier is switched on and the input voltage U1 is negative.

By controlling the switch node voltage Uti, the inductor voltage Uli and, therefore, the input current Ii can be controlled. More specifically, an average of the input current Ii over each drive cycle can be controlled. Basically, at a given input voltage U1, the lower the magnitude of the switch node voltage Uti, the higher the inductor voltage Uli and the higher the input current. According to one example, the PWM circuit 62 controls operation of the switching circuit 62 such that, in each drive cycle, a duration for which the synchronous rectifier is switched on, is proportional to a magnitude of the duty cycle signal. In this example, the average $Uti_{AVG}$ of the switch node voltage Uti over one drive cycle is given by $$Uti_{AVG}=di \cdot Udci \qquad (6),$$

wherein, as outlined above, the duty-cycle may be positive (during positive half-waves of the input voltage Ui) or negative (during negative half-waves of the input voltage Ui).

By regulating the switch node voltage Uti, not only the input current Ii but also the common mode voltage Unm can be adjusted. This is explained in detail herein further below, with regard to the control circuit 4 and its functionality.

Figure 18:
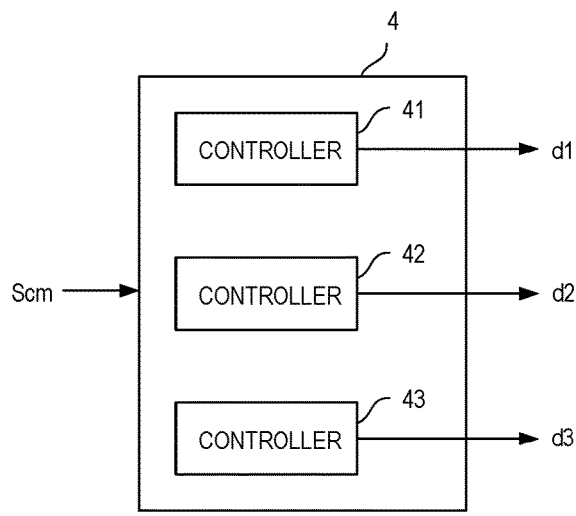
FIG. 18 shows a block diagram of a control circuit to control operation of the power converter arrangement.

FIG. 18 illustrates a block diagram of the control circuit 4 according to one example. In this example, the control circuit 4 includes three controllers, a first controller 41, a second controller 42, and a third controller 43. The first controller 41 is configured to provide a first duty-cycle signal d1 for controlling the first power converter 1, the second controller 42 is configured to provide a second duty-cycle signal d2 for controlling operation of the second power converter 2 and the third controller 43 is configured to provide a third duty-cycle signal d3 for controlling operation of the third power converter 3. Each of these duty-cycle signals d1, d2, d3 may be positive or negative, as explained above.

Figure 19:
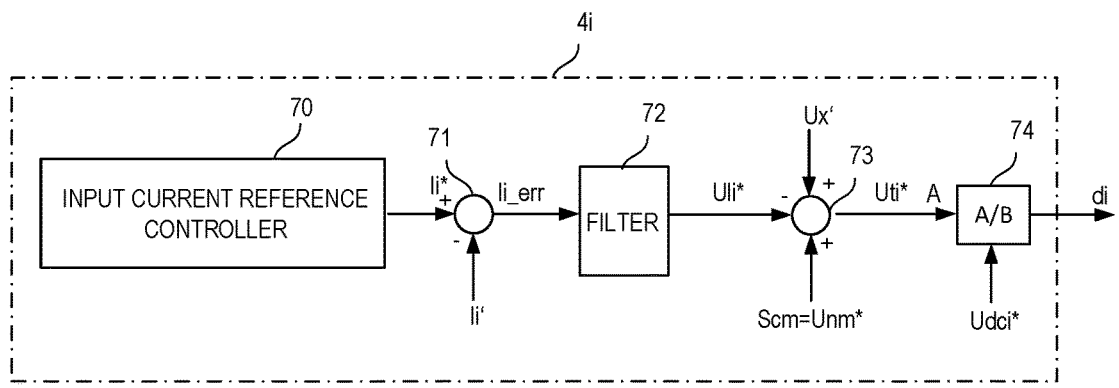
FIG. 19 illustrates one example of a controller configured to control operation of one of the single phase power converters.
Figure 20:
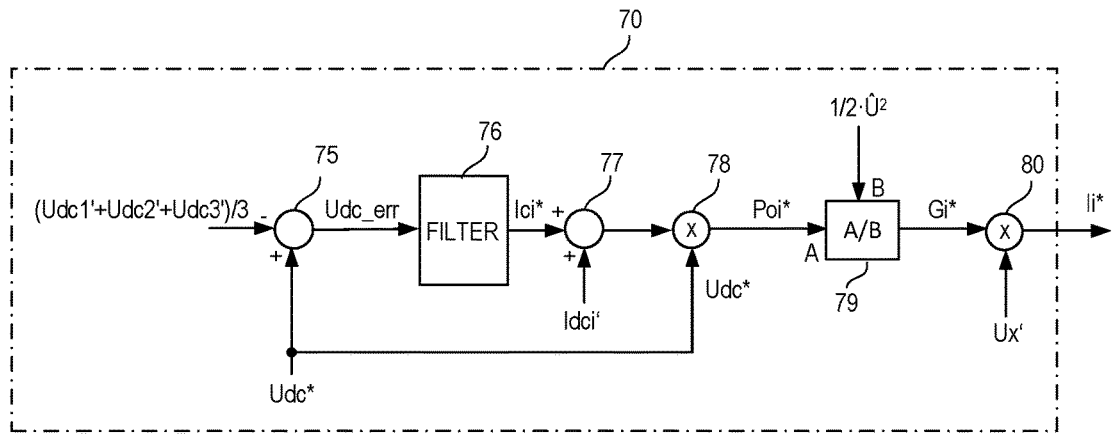
FIG. 20 illustrates on example of a input current reference controller implemented in the controller according to FIG. 19.

FIG. 19 illustrates one example of the controllers 4a, 4b, 4c in greater detail, wherein reference character 4i in FIG. 19 denotes an arbitrary one of the three controllers 41, 42, 43 shown in FIG. 18. Referring to FIG. 19, the controller 4i includes an input current reference controller 70 that is configured to provide an input current reference Ii*. The input current reference Ii* represents a desired input current of the respective power converter i. One example of the input current reference controller 70 is illustrated in FIG. 20 and is explained herein further below.

Referring to FIG. 19, the controller 4i further includes an error filter 72 that receives an error signal Ii_err, wherein the error signal represents a difference between the input current reference Ii* and the input current Ii and. The error signal Ii_err may be generated by a subtractor 71 that receives the input current reference Ii* and a measured input current Ii' that represents the input current Ii. The input current Ii may be measured in a conventional way using any kind of current measurement device (not shown) in order to obtain the measured input current Ii'. The filter 72 may have one of a proportional-integrative (PI) characteristic, a proportional-integrative-derivative (PID), or the like. An output signal Uli* of the filter 72 represents an inductor voltage reference, which is a desired voltage level of the voltage Uli across the inductor 61.

Referring to FIG. 19, a switch node voltage reference Uti* is generated based on the inductor voltage reference Uli*. Referring to the above, by suitably adjusting the switch node voltage Uti, both the inductor voltage Uli and the common mode voltage Unm can be adjusted. For this, in the example shown in FIG. 12, calculating the switch node voltage reference Uti* includes subtracting the inductor voltage reference Uli* from a desired input voltage Ui* of the power converter by a subtractor 73. The desired input voltage Ui* is given by the associated supply voltage Ux plus a common mode voltage reference Unm*. The common mode voltage reference Unm* represents a desired voltage of the common mode voltage Unm and forms the common signal Scm in this example. The supply voltage Ux may be measured in a conventional way using any kind of voltage measurement device (not shown) in order to obtain a measured supply voltage Ux'. The subtractor 73, in addition to the inductor voltage reference Uli* and the common mode voltage reference Unm* receives the measured supply voltage Ux' representing the supply voltage Ux.

Each of the first, second and third controllers 41, 42, 43 according to FIG. 18 receives the same common mode voltage reference Unm*. Due to the coupling of the power converters 1, 2, 3 explained above and due to the first, second and third controllers 41, 42, 43 receiving the same common mode voltage reference Unm*, each of the controllers 41, 42, 42 is configured to regulate the respective input current I1, I2, I3 dependent on a respective input current reference (Ii* in FIG. 19). At the same time, the three controllers 41, 42, 43 are configured to adjust the common mode voltage Unm dependent on the common mode voltage reference Unm* by adjusting the respective switch node voltage reference (Uti* in FIG. 19) dependent on the common mode voltage reference Unm*.

The common mode voltage reference Unm* is generated in accordance with equation (4a) or (4b) by a signal generator (not shown) that receives one of the supply voltages Ua, Ub, Uc or a frequency and phase of one of the supply voltages Ua, Ub, Uc, for example.

Referring to FIG. 19, the controller 4i is further configured to generate the duty cycle signal di based on the switch node voltage reference Uti*. The switch node voltage reference Uti* represents a desired signal level of the switch node voltage Uti. More specifically, the switch node voltage reference Uti* represents a desired level of the average switch node voltage Uti$_{AVG}$ over one drive cycle. According to one example, and in accordance with equation (6), controller 4i includes a divider 74 that receives the switch node voltage reference Uti* and a DC link voltage reference Udci* and calculates the duty cycle signal di dependent on the switch node voltage reference Uti* and a DC link voltage reference Udci* as follows, $$di = \frac{Uti^*}{Udci^*}. \tag{7a}$$

The divider 74 may be configured to output a new duty cycle signal di once at the beginning of each drive cycle. Instead of calculating the duty cycle signal di dependent on the switch node voltage reference Uti* and the DC link voltage reference Udci* it is also possible to calculate the duty cycle signal di dependent on the switch node voltage reference Uti* and the DC link voltage Udci as follows $$di = \frac{Uti^*}{Udci}. \tag{7a}$$

Referring to FIG. 12, controller 4i is configured to generate the duty cycle signal di dependent on the DC link voltage reference Udci* of the respective power converter. According to one example, DC link voltage reference Udc1*, Udc2*, Udc3* that govern regulating the DC link voltages Udc1, Udc2, Udc3 in the individual power converters are identical, Udc1*=Udc2*=Udc3*=Udc*, so that the three power converters 1, 2, 3 generate DC link voltages Udc1, Udc2, Udc3 with identical voltage levels that are governed by a common DC link voltage reference Udc*.

FIG. 20 illustrates one example of the input current reference controller 70. This input current reference controller 70 is configured to generate the input current reference Ii* such (a) that the DC link voltage of the respective power converter is regulated to have a voltage level that is defined by the common DC link voltage reference Udc* and (b) the input current Ii has a current waveform that is defined by the waveform of the associated supply voltage Ux. Referring to FIG. 20, the input current reference controller 70 generates a DC link voltage error signal Udc_err. In the example shown in FIG. 20, the DC link voltage error signal Udc_err is a common error signal, which is the same for each of the three controllers 41, 42, 43 and is calculated based on the common DC link voltage reference Udc* and three measured DC link voltages Udc1', Udc2', Udc3' as follows, $$\text{Udc\_err} = U d c^* - \frac{U d c 1' + U d c 2' + U d c 3'}{3}, \quad (8)$$

wherein each of the three measured DC link voltages Udc1', Udc2', Udc3' represents a respective one of the DC link voltages Udc1, Udc2, Udc3 and may be obtained by measuring the respective the DC link voltages Udc1, Udc2, Udc3 using any kind of voltage measurement device. Generating a common error signal Udc_err helps to balance the (average) input power of the three power converters 1, 2, 3 in an application scenario in which it is desired that the three DC link voltages Udc1, Udc2, Udc3 have identical voltage levels.

Generating the error signal in accordance with equation (8), however, is only an example. According to another example, an individual error signal is generated in the input current reference controller 70 of each of the three controllers 41, 42, 43 based on the respective measured DC link voltage Udc1', Udc2', Udc3' and the common DC link voltage reference Udc* or an individual DC link voltage reference Udc1*, Udc2*, Referring to FIG. 20 a filter 76 receives the DC link voltage error signal Udc_err. The filter 76 may have one of a proportional-integrative (PI) characteristic, a proportional-integrative-derivative (PID) characteristic, or the like. An output signal of the filter represents an capacitor current reference Ici*, which represents a current level of a desired current Ici into the respective output capacitor i6. The inductor current reference Ici* represents the current that is required to flow into the capacitor i6 in order to regulate the DC link voltage Udci such that a voltage level of the DC link voltage Udci equals the voltage level represented by the DC link voltage reference Udc*.

An adder 77 adds the capacitor current reference Ici* to the measured output current Idci'. The measured output current Idci' represents the output current Idci of the power converter and may be obtained by measuring the output current Idci using any kind of conventional current measurement device (not shown). An output signal of the adder 77 is multiplied with the DC link voltage reference Udc* by a multiplier 78, wherein an output signal Poi* of the multiplier 78 represents a desired output power of the power converter Ii. The desired output power is the output power that is required to regulate the DC link voltage Udci such that is essentially equals the DC voltage reference Udc*.

Referring to FIG. 20, a divider 79 divides the output power reference Poi* by a signal ½·Û² that represents 0.5 times (½ times) the square of the amplitude U of the supply voltages Ua, Ub, Uc. An output signal Gi* of the divider 79 represents an overall desired conductance of the power converter i, wherein the overall desired conductance Gi* is the conductance that is required by the power converter i in order to achieve the desired input power Poi*. The overall desired conductance G* is also referred to as conductance reference in the following.

Referring to FIG. 20, multiplier 80 receives the conductance reference Gi* and the measured supply voltage Ux' and outputs the input current reference Ii*. In this example, the input current reference Ii* is proportional to the associated supply voltage Ux, wherein a proportionality factor is given by the conductance reference Gi*, so that a phase shift between the input current reference Ii* and the associated supply voltage Ux is zero. This, however, is only an example. To achieve a phase shift between the input current reference Ii* and the supply voltage Ux it is also possible to provide to the multiplier 80 a phase shifted version of the measured supply voltage Ux'.

Figure 21:
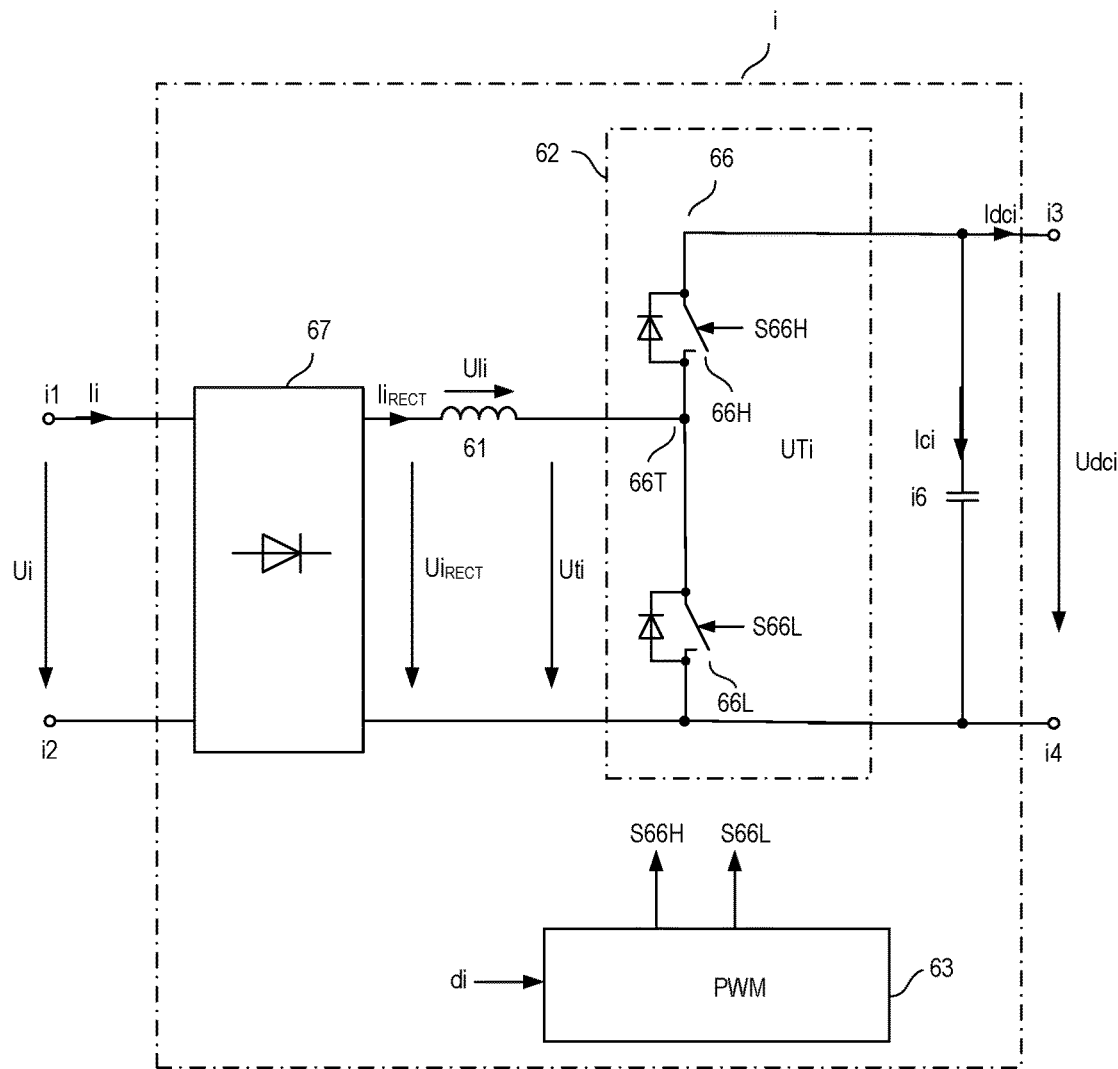
FIG. 21 shows a power converter according to a further example.

Referring to the above, implementing the power converters 1, 2, 3 with a Totem pole topology is only an example. Another example for implementing the power converters 1, 2, 3 is illustrated in FIG. 21. Power converter i illustrated in FIG. 21 represents an arbitrary one of the power converters 1, 2, 3. The power converter i according to FIG. 21, in addition to the inductor 61 and the switching circuit 62 includes a rectifier 67 that is connected between the input i1, i2 and the inductor 61 and that is configured to provide a rectified input voltage $Ui_{RECT}$ and a rectified input current $Ii_{RECT}$ based on the input voltage U1 and the input current Ii. The rectified input voltage $U1_{RECT}$ and the rectified input current $Ii_{RECT}$ only have one polarity. The rectifier 67 is a bridge rectifier, for example.

In the power converter according to FIG. 21, the switching circuit 62 includes only one half-bridge 66 with a high-side switch 66H and a low-side switch 66L that are connected in series between the output nodes i3, i4. The inductor 61 is connected to a tap 66T of the half-bridge. In this switching circuit 62, the high-switch 66H is connected between the tap 66T and the first output node i3 and acts as a synchronous rectifier. The low-side switch 66L is connected between the tap 66T and the second output node i4 and acts as a control switch. Furthermore, a series circuit including the inductor 61 and the low-side switch 66L receives the rectified input voltage $U1_{RECT}$ from the rectifier.

The high-side switch 66H and the low-side switch 66L are controlled by a PWM circuit dependent on the duty-cycle signal. This duty cycle signal can be generated by a controller of the type shown in FIGS. 19 and 20, wherein the measured supply voltage Ux' is to be replaced by a signal representing the magnitude |Ux'| of the measured supply voltage Ux'. Furthermore, Ii' is to be replaced by the measured rectified input current and Ii* represents the current reference of the rectified input current $Ii_{RECT}$. In this case, the duty-cycle signal di is always positive (or zero).

Figure 22:
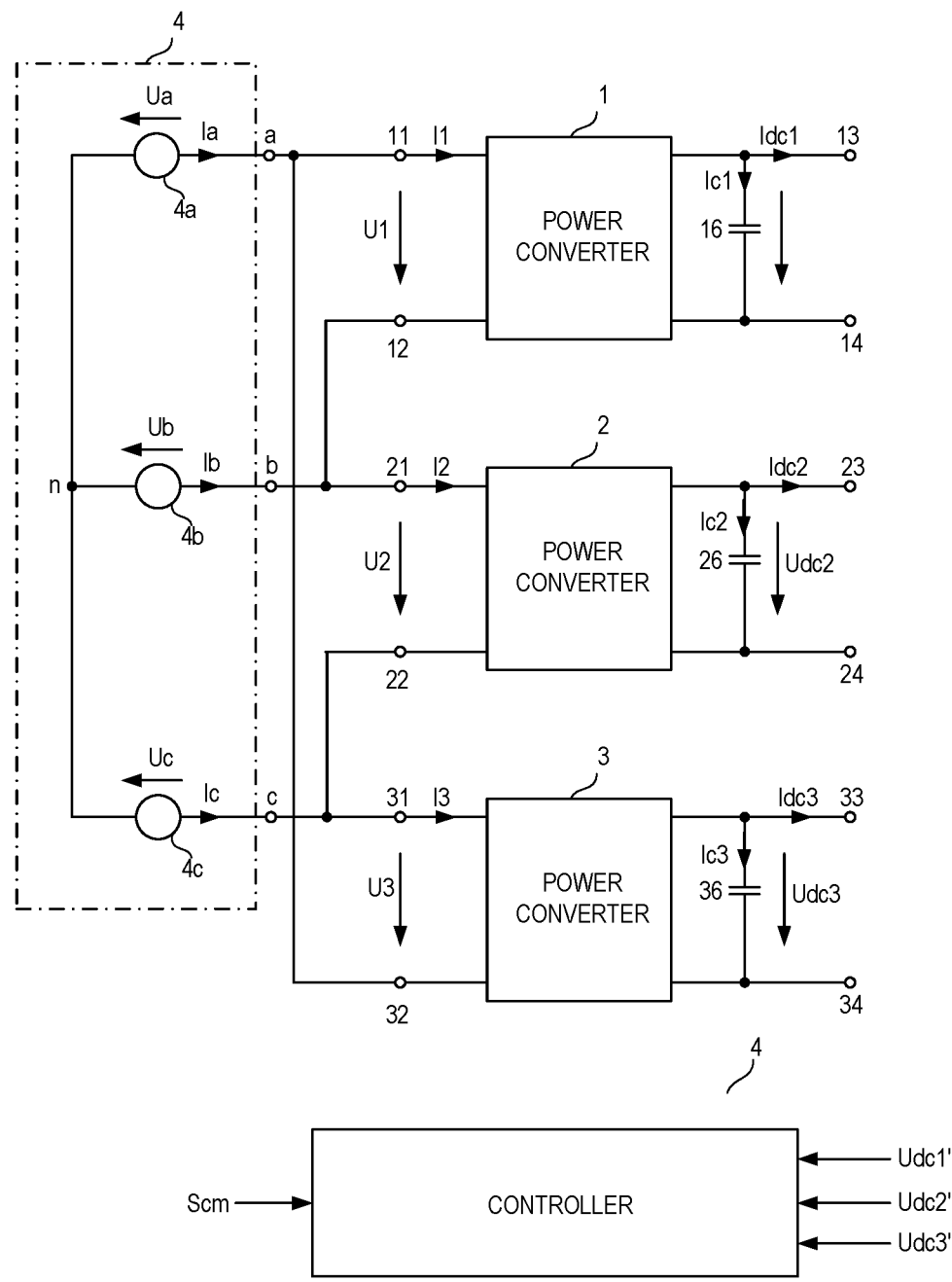
FIG. 22 shows one example of the power converter arrangement according to FIG. 1 in which the individual power converters are connected in a delta configuration.

In the example illustrated in FIG. 5, in which the single phase power sources 4a, 4b, 4c are connected in a star configuration, the common mode signal adjusted by the common mode signal Scm represents the desired common mode voltage Unm between the reference node n of the 3-phase power supply 4 and the floating circuit node m. FIG. 22 illustrates a further example of a 3-phase power source 4.

In the example shown in FIG. 22, the power sources are connected in a star configuration and the first, second and third power converters 1, 2, 3 are connected in a delta configuration. This includes that the power converters 1, 2, 3 are coupled with each other such that each of the first, second and third power converters 1, 2, 3 has its respective first input node 11, 21, 31 connected to the second input node 12, 22, 32 of another one of the power converters, wherein in each case exactly one first input node is connected to exactly one second input node. More specifically, in the example shown in FIG. 22, the first input node 11 of the first power converter 1 is connected to the second input node 32 of the third power converter 3; the first input node 12 of the second power converter 2 is connected to the second input node 12 of the first power converter 1; and the first input node 31 of the third power converter 3 is connected to the second input node 22 of the second power converter 3.

Furthermore, each of the first input nodes 11, 21, 31 and the respective second input node 32, 12, 22 connected thereto is connected to one of the output nodes a, b, c of the 3-phase power supply 4. The 3-phase power supply 4 is implemented in the same way as explained with reference to FIG. 5. More specifically, in the example shown in FIG. 22, each of the first input node 11 of the first power converter 1 and the second output node 32 of the third power converter 3 is connected to the first output node a of the power supply 4; each of the first input node 21 of the second power converter 2 and the second output node 12 of the first power converter 1 is connected to the second output node b of the power supply 4; and each of the first input node 31 of the third power converter 3 and the second output node 22 of the second power converter 2 is connected to the third output node c of the power supply 4.

In the example shown in FIG. 22, each of the power converters 1, 2, 3 receives an input voltage U1, U2, U3 which is based on two of the supply voltages Ua, Ub, Uc. More specifically, the input voltage U1 received by the first power converter 1 is given by the first supply voltage Ua minus the second supply voltage Ub, U1=Ua−Ub; the input voltage U2 received by the second power converter 2 is given by the second supply voltage Ub minus the third supply voltage Uc, U2=Ub−Uc; and the input voltage U3 received by the third power converter 3 is given by the third supply voltage Uc minus the first supply voltage Ua. As compared to the star configuration, the input voltages U1, U2, U3 are higher and are only dependent on the supply voltages Ua, Ub, Uc.

Basically, in the arrangement according to FIG. 22, it is desirable to operate the power converter arrangement such that the currents Ia, Ib, Ic provided by the single phase power supplies 4a, 4b, 4c are in phase with the respective supply voltage. According to one example, the supply voltages Ua, Ub, Uc are in accordance with equations (1a)-(1c), so that the supply currents Ia, Ib, Ic are given by, $$Ic=\hat{I}\cdot\sin(\omega t+\varphi a) \tag{10a}$$

$$Ic=\hat{I}\cdot\sin(\omega t+\varphi a+2\pi/3) \tag{10b}$$

$$Ic=\hat{I}\cdot\sin(\omega t+\varphi a+4\pi/3) \tag{10c}$$

In the power converter arrangement according to FIG. 22, regulating a respective input parameter of each of the power converters 1, 2, 3 includes regulating the respective input current I1, I2, I3 such that each of the input currents I1, I2, I3 is given for a balanced three-phase system by the supply currents Ia, Ib, Ic plus a common mode current Icm, so that, $$I1 = \frac{Ia-Ib}{3} + Icm = \hat{I}\cdot\left(\sin(\omega t+\varphi a) - \sin\left(\omega t+\varphi a+\frac{2\pi}{3}\right)\right) + Icm \tag{11a}$$

$$I2 = \tag{11b}$$
$$\frac{Ib-Ic}{3} + Icm = \hat{I}\cdot\left(\sin\left(\omega t+\varphi a+\frac{2\pi}{3}\right) - \sin\left(\omega t+\varphi a+\frac{4\pi}{3}\right)\right) + Icm$$

$$I3 = \frac{Ic-Ia}{3} + Icm = \hat{I}\cdot\left(\sin\left(\omega t+\varphi a+\frac{4\pi}{3}\right) - \sin(\omega t+\varphi a)\right) + Icm \tag{11c}$$

The common mode current Icm is adjusted via the common mode signal Scm received by a control circuit 4, wherein the control circuit 4 is configured to control operation of the power converters 1, 2, 3. According to one example, the common mode signal Scm is configured to adjust the common mode current Icm in such a way that the common mode current Icm is as follows, $$Icm=\Sigma_j M_j \cdot \hat{I}\cdot\sin(j\cdot\omega t+\varphi_j+\varphi a) \tag{12a}$$

where j=3+6·k, where k is an integer, where k≥0, where φj is a phase shift that is explained herein further below, and where $\hat{I}$ is the amplitude of the supply currents Ia, Ib, Ic. The amplitude $\hat{I}$ may be obtained by sensing one of the supply currents Ia, Ib, Ic and determining a maximum of the magnitude. Alternatively, each of the supply currents Ia, Ib, Ic is sensed, the maximum of the magnitude of each of the supply currents Ia, Ib, Ic is determined, and the amplitude $\hat{I}$ is obtained by calculating an average of the maxima of the magnitudes.

Thus, referring to equation (12a), the common mode current Icm may be dependent on the $3^{rd}$, $9^{th}$, $15^{th}$, $21^{th}$, . . . harmonics of currents proportional to voltages of the supply voltage system. The common mode current may also be expressed as follows:

$$Icm=M_{i3}\cdot\hat{I}\cdot\sin(3\cdot\omega t+\varphi_3+\varphi a)+M_{i9}\cdot\hat{I}\cdot\sin(9\cdot\omega t+\varphi_9+\varphi a)+ \\ M_{i15}\cdot\hat{I}\cdot\sin(15\cdot\omega t+\varphi_{15}+\varphi a)+\ldots M_{i21}\cdot\hat{I}\cdot\sin \\ (21\cdot\omega t+\varphi_{21}+\varphi a)+ \tag{12b}$$

Adjusting the common mode current in this way reduces the energy storage requirement ΔE of the output capacitor 16, 26, 36 of each of the power converters 1, 2, 3. This is explained with reference to FIG. 23.

Figure 23:
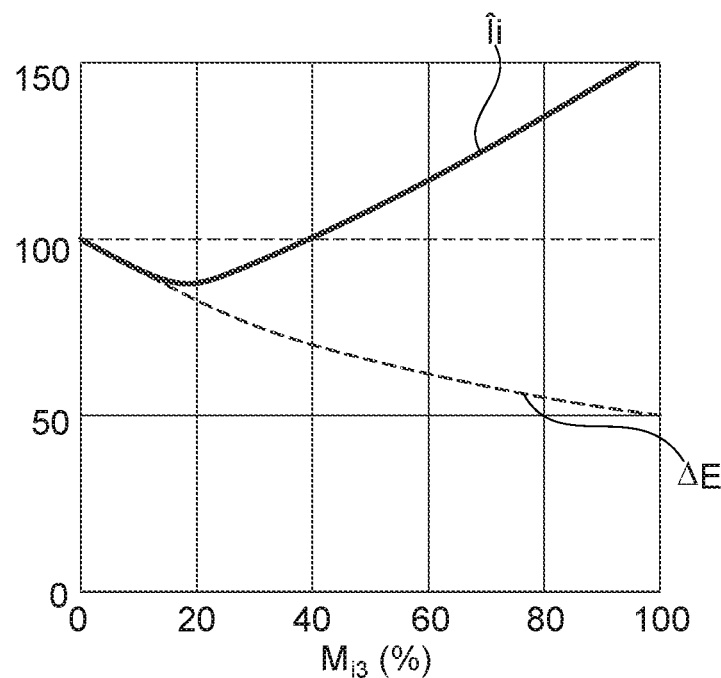
FIG. 23 shows the energy storage requirement of the output capacitors of the power converters and an amplitude of input currents received by the power converters dependent on a scaling factor of a common mode current.

FIG. 23 illustrates the energy storage requirement ΔE in each power converter 1, 2, 3 of an arrangement shown in FIG. 22 when the common mode current Icm is given by $$Icm=M_{i3}\cdot\hat{I}\cdot\sin(3\cdot\omega t+\varphi_3+\varphi a) \tag{13}$$

Thus, in this example, the common mode current Icm is only dependent on the third harmonic of the supply voltages Ua, Ub, Uc. FIG. 23 illustrates the energy storage requirement ΔE dependent on a scaling factor $M_{i3}$, wherein the scaling factor $M_{i3}$ defines the amplitude of the common mode current Icm relative to the amplitudes of the supply currents Ia, Ib, Ic, wherein $M_{i3}=0$ (0%) represents the conventional scenario in which the common mode voltage Unm is zero, so that each of the power converters 1, 2, 3 receives a respective one of the supply voltages Ua, Ub, Uc. Furthermore, $M_3=1$ (100%) represents a scenario in which the amplitude of the common mode current Icm equals the amplitude of the supply currents Ia, Ib, Ic. Furthermore, FIG. 23 illustrates the energy storage requirement ΔE relative to the energy storage requirement in the conventional scenario ($M_{i3}=0$).

As can be seen from FIG. 23, increasing the amplitude of the common mode current Icm results in a reduction of the energy storage requirement ΔE. When the amplitude of the common mode current Icm equals the amplitude of the supply currents Ia, Ib, Ic, for example, the energy storage requirement ΔE is only 50% of the energy storage requirement ΔE in the conventional scenario ($M_3=0$).

Referring to FIG. 23, increasing the amplitude of the common mode current Icm may increase an amplitude of the input currents I1, I2, I3, wherein $\hat{I}i$ in FIG. 23 represents the amplitude of an arbitrary one Ii of the input currents I1, I2, I3.

Figure 24:
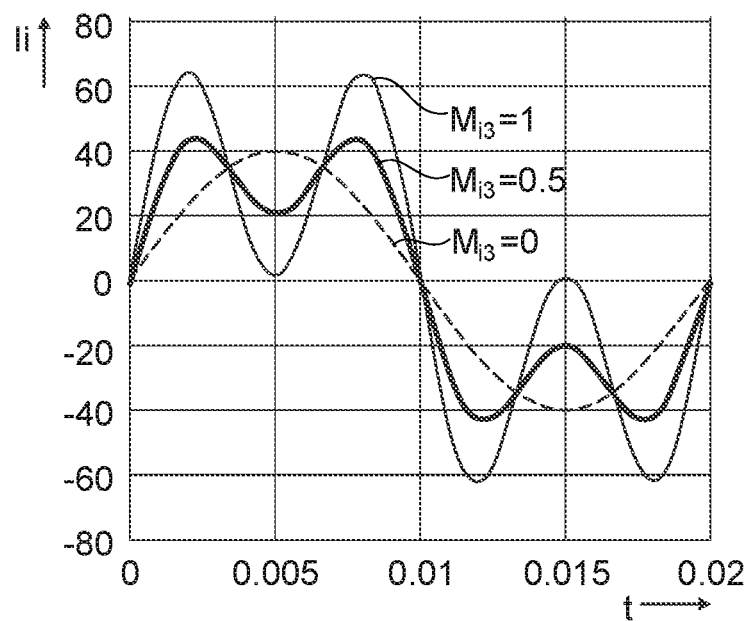
FIG. 24 shows signal diagrams of the input currents dependent on different scaling factors of the common mode current.

Increasing the amplitude $\hat{I}i$ dependent on the scaling factor $M_{i3}$ is also illustrated in FIG. 24, which shows signal diagrams of the input current Ii at different scaling factors $M_{i3}$ over one period of the respective input voltage Ui. FIG. 24 illustrates the input current Ii at $M_3=0$ (0%), at $M_3=0.5$ (50%), and at $M_3=1$ (100%), wherein $M_3=0$ represents the conventional scenario in which the input current Ii equals the associated supply current Ix, that is, the first input current I1 equals supply current Ia, the second input current I2 equals supply current Ib, and the third input current I3 equals supply current Ic.

Figure 25:
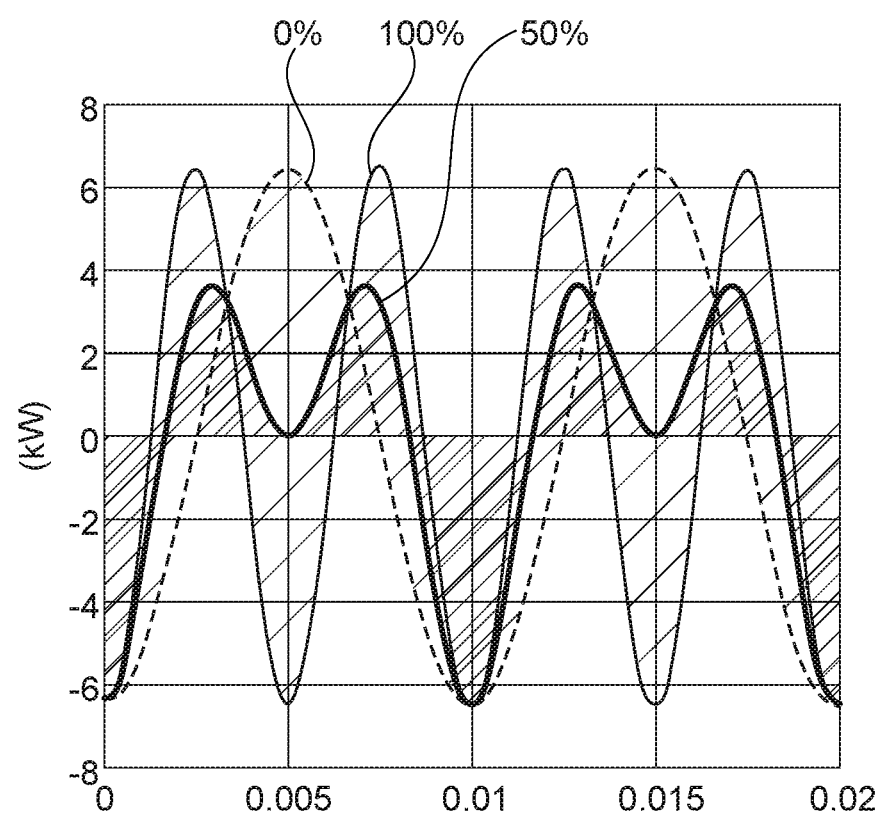
FIG. 25 illustrates input powers of the power converters dependent on different scaling factors of the common mode current.

FIG. 25 illustrates the pulsating input power Pin at scaling factors $M_3=0$, $M_3=0.5$, and $M_3=1$. As can be seen, at $M_3=0.5$ there are time periods in which the input power varies less than the input power in the conventional scenario ($M_3=0$), so that the energy storage requirement $\Delta E$ is reduced. At $M_3=1$ an amplitude of the varying input power is essentially the same as the amplitude of the varying input power in the conventional case. However, the frequency is about twice the frequency as in the conventional case, which also results in a reduction of the energy storage requirement $\Delta E$.

In the arrangement according to FIG. 22, the power converters may be implemented in accordance with any of the examples explained with reference to FIGS. 15, 16, and 21. According to one example, the power converters 1, 2, 3 have a Totem pole topology, as illustrated in FIG. 16. The control circuit 4 may be implemented as illustrated in FIG. 18, wherein the first, second and third controllers 41, 42, 43 may be (slightly) different than the first, second and third controllers 41, 42, 43 that may be used for controlling the power converters 1, 2, 3 in a star configuration.

Figure 26:
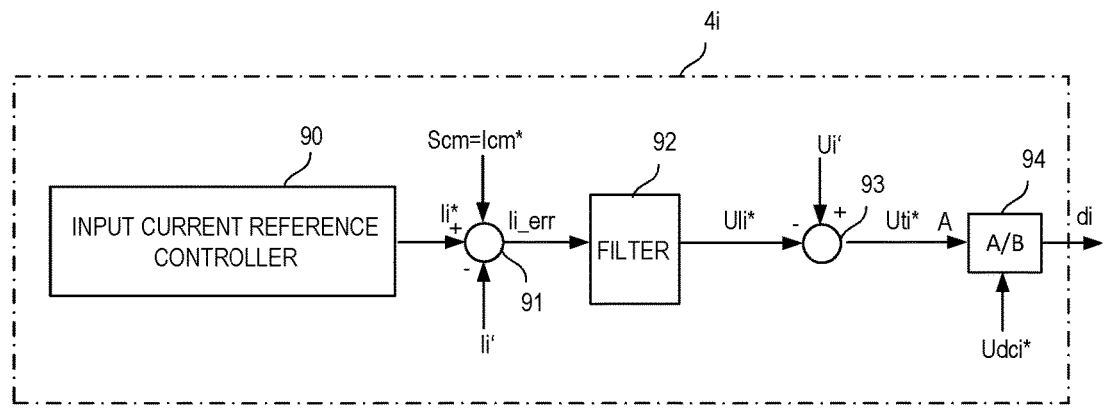
FIG. 26 shows one example of a controller configured to control operation of a power converter in the power converter arrangement according to FIG. 22.

FIG. 26 illustrates one example of a controller 4i that is configured to control operation of a respective one of the power converters 1, 2, 3 shown in FIG. 22. The controller 4i is based on the controller 4i shown in FIG. 19, includes an input current reference controller 90, a subtractor 91, a filter 92, a subtractor 93, and a divider 94, and is configured to output the duty-cycle signal di. The controller 4i according to FIG. 26 is different from the controller 4i according to FIG. 19 in that a common mode current reference Icm* is considered in the calculation of the current error signal Ii_err. The common mode current reference Icm* forms the common mode signal Scm and is added to the input current reference Ii* provided by the input current reference controller 90. The measured input current Ii' is subtracted from the sum of the common mode current reference Icm* and the input current reference Ii* to provide the error signal Ii_err. The error signal Ii_err is filtered by filter 90, wherein an output signal of the filter 92 forms the inductor voltage reference Uli*. The inductor voltage reference Uli* is subtracted from the measured input voltage U1' by subtractor 93 that provides the switch node voltage reference Uti*. Based on the switch node voltage reference Uti* and the DC link voltage reference Udci*, divider 94 generates the duty-cycle signal.

Figure 27:
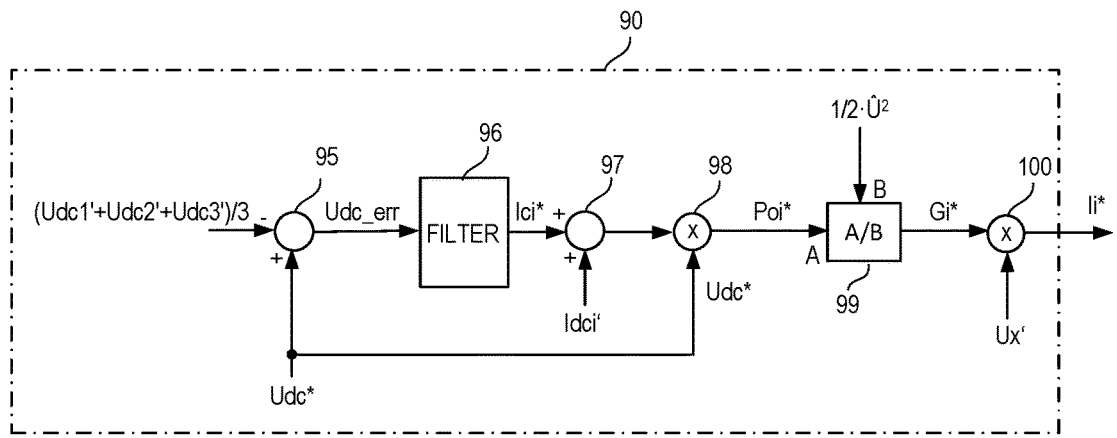
FIG. 27 illustrates on example of a input current reference controller implemented in the controller according to FIG. 26.

The input current reference controller 90 according to FIG. 26 may be implemented in the same way as the input current reference controller 70 according to FIG. 20. FIG. 27 illustrates one example of the current reference controller 90 implemented in accordance with the example shown in FIG. 20.

Subtractor 95 according to FIG. 27 corresponds to subtractor 75 according to FIG. 20, filter 96 corresponds to filter 76, adder 97 corresponds to adder 77, multiplier 98 corresponds to multiplier 78, divider 99 corresponds to divider 79, and multiplier 100 corresponds to multiplier 80. The input current reference controller 90 according to FIG. 27 is different from the input current reference controller 70 according to FIG. 20 only in that multiplier 100 according to FIG. 27 multiplies the desired conductance Gi* with the measured input voltage U1' while, as explained above, multiplier 80 according to FIG. 20 multiplies the desired conductance Gi* with the measured supply voltage Ux'.

In the examples explained above, the power converter arrangement with the three power converters 1, 2, 3, is connected to a 3-phase power supply that provides three different supply voltages Ua, Ub, Uc. This, however, is only an example. According to another example, the power converter arrangement operates as a single phase power converter. In this example, the power supply 4 only includes one single phase power supply, so that each of the power converters 1, 2, 3 receives the same input voltage.

Furthermore, with reference to the examples explained above, a rectifier mode of the power converter arrangement has been explained, which is an operating mode in which power is received from the power supply 4 and transferred to the load 5. However, operating the power converter arrangement in the rectifier mode is only an example. It is also possible to operate the power converter arrangement in an inverter mode, which is an operating mode in which the power converter arrangement receives power from the load 5, which may include one or more batteries, and transfers the power to the power supply 4, which may include a power grid. In this case, the power converters 1, 2, 3 are implemented with a topology, such as the Totem pole topology illustrated in FIG. 16, that facilitates a transfer of power from the load 5 to the power supply 4.

Figure 28:
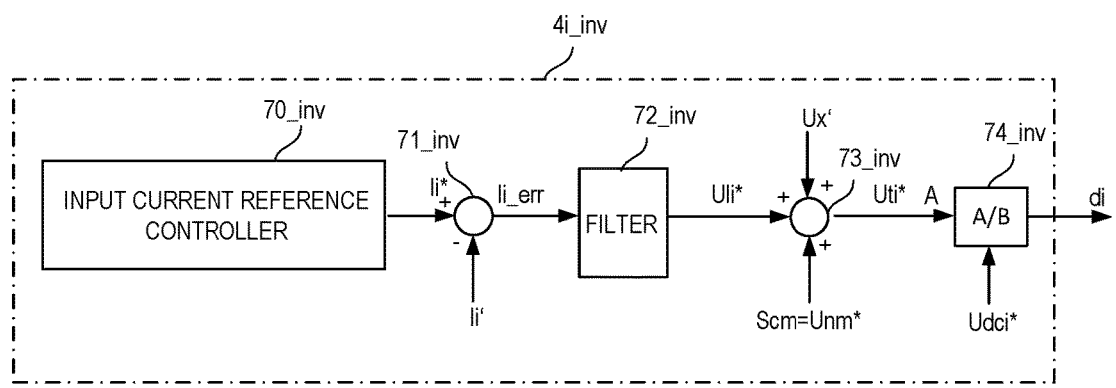
FIG. 28 illustrates one example of a controller configured to control operation of one of the single phase power converters in an inverter mode.

FIG. 28 illustrates one example of a control circuit 4i_inv that is configured to operate a respective one of the converters 1, 2, 3 in the arrangement according to FIG. 5 (star configuration of the power supply 5 and the power converters 1, 2, 3) in an inverter mode. The control circuit 4i_inv according to FIG. 28 is based on the control circuit according to FIG. 19. In the control circuit according to FIG. 28, same parts as in the controller according to FIG. 20 have same reference numbers, wherein "_inv" has been added to the reference numbers in FIG. 28.

As can be seen, the topology of the control circuit 4i_inv according to FIG. 28 is identical with the topology of the control circuit 4i according to FIG. 19, wherein the control circuit 4i_inv according to FIG. 28 is different from the control circuit according to FIG. 19 only in that the inductor voltage reference Uli* is added by adder 73_inv to the measured input voltage Ux' and the common mode signal Scm, instead of being subtracted. Input current reference controller 70_inv defines the desired input current Ii* which. In the inverter mode, the input current flows in the opposite direction as in the rectifier mode. This is achieved by adding the inductor voltage reference Uli* to the measured input voltage Ux' and the common mode signal Scm, instead of subtracting it from the measured input voltage Ux' and the common mode signal Scm, as in the rectifier mode.

Figure 29:
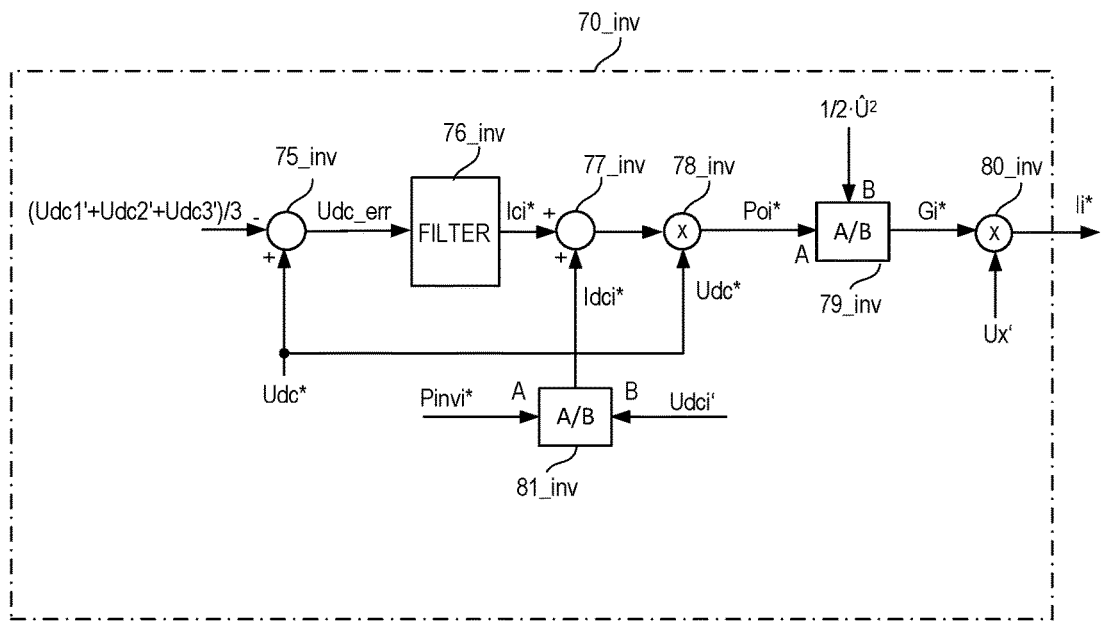
FIG. 29 illustrates on example of a input current reference controller implemented in the controller according to FIG. 28.

FIG. 29 illustrates one example of the input current reference controller 70_inv. The input current reference controller 70_inv according to FIG. 29 is based on the input current reference controller 70 according to FIG. 20. In the input current reference controller 70_inv according to FIG. 29, same parts as in the input current reference controller 70 according to FIG. 20 have same reference numbers, wherein "_inv" has been added to the reference numbers in FIG. 29.

As can be seen, the topology of the input current reference controller 70_inv according to FIG. 29 is very similar with the topology of the input current reference controller 70 according to FIG. 20. The input current reference controller 70_inv according to FIG. 29 is different from the input current reference controller 70 according to FIG. 20 only in that adder 77_inv receives a DC current reference Idci* instead of the measured DC current Idci' received by adder 77 in the current reference controller 70 control circuit according to FIG. 20. The DC current reference Idci* defines the current that is to be drawn from the load 5 and, therefore, defines the (average) power that is transferred from the load 5 to the power supply 4.

According to one example, the DC current reference Idci* is provided by a divider 81_inv that receives a power reference Pinvi*, which defines the power that is to be received from the respective power converter i from the load at the respective output nodes i3, i4, and the measured DC voltage Udci' at the respective output nodes i3, i4. In the inverter mode, the DC voltage Udci at the output nodes i3, i4 is defined by the load 5, which includes a battery, for example. Referring to FIG. 29, divider 81_inv divides the power reference Pinvi* by the measured DC voltage Udci' to provide the DC current reference Idci*.

The input current reference controller 70_inv according to FIG. 29, in addition to the input current Idci received from the load 5, also regulates the DC link voltage Udci at the circuit nodes i3, i4 of each converter i to a voltage level as defined by the DC link voltage reference Udc*. This, however, is only an example According to another example, in the rectifier mode, the DC link voltages Udc1, Udc2, Udc3 of the converters 1, 2, 3 are defined by the load, wherein the load 5 may include one or more batteries connected to the output nodes 13, 14, 23, 24, 33, 34 of the converters 1, 2, 3. In this case, the input current reference controller 70_inv according to FIG. 29 may be simplified by omitting subtractor 75_inv, filter 76_inv, adder 77_inv, multiplier 78_inv and divider 81_inv and by providing the power reference Pinvi* (instead of Poi*) to divider 79_inv.

In the inverter mode, the input voltages U1, U2, U3 of the converters 1, 2, 3 are adjusted based on the common mode signal Scm (the common mode voltage Unm) in the same way as explained with reference to the inverter mode. Thus, the benefits explained above that result from adjusting the input voltages U1, U2, U3 based on the common mode voltage Unm in the rectifier mode apply to operating the converters 1, 2, 3 in the inverter mode accordingly.

Figure 30:
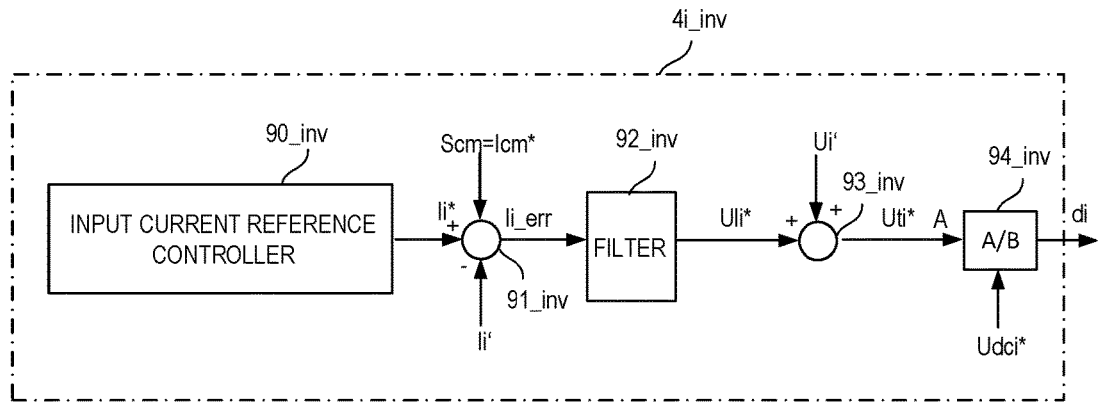
FIG. 30 illustrates one example of a controller configured to control operation of one of the single phase power converters in an inverter mode.

FIG. 30 illustrates one example of a control circuit 4i_inv that is configured to operate a respective one of the converters 1, 2, 3 in the arrangement according to FIG. 22 (star configuration of the power supply 5 and delta configuration of the power converters 1, 2, 3) in an inverter mode. The control circuit 4i_inv according to FIG. 30 is based on the control circuit according to FIG. 26. In the control circuit according to FIG. 30, same parts as in the controller according to FIG. 26 have same reference numbers, wherein "_inv" has been added to the reference numbers in FIG. 30.

As can be seen, the topology of the control circuit 4i_inv according to FIG. 30 is identical with the topology of the control circuit 4i according to FIG. 26, wherein the control circuit 4i_inv according to FIG. 30 is different from the control circuit according to FIG. 26 only in that the inductor voltage reference Uli* is added by adder 93_inv to the measured input voltage Ux' and the common mode signal Scm, instead of being subtracted. Input current reference controller 90_inv defines the desired input current Ii*. In the inverter mode, the input current flows in the opposite direction as in the rectifier mode. This is achieved by adding the inductor voltage reference Uli* to the measured input voltage Ux' and the common mode signal Scm, instead of subtracting it from the measured input voltage Ux' and the common mode signal Scm, as in the rectifier mode.

Figure 31:
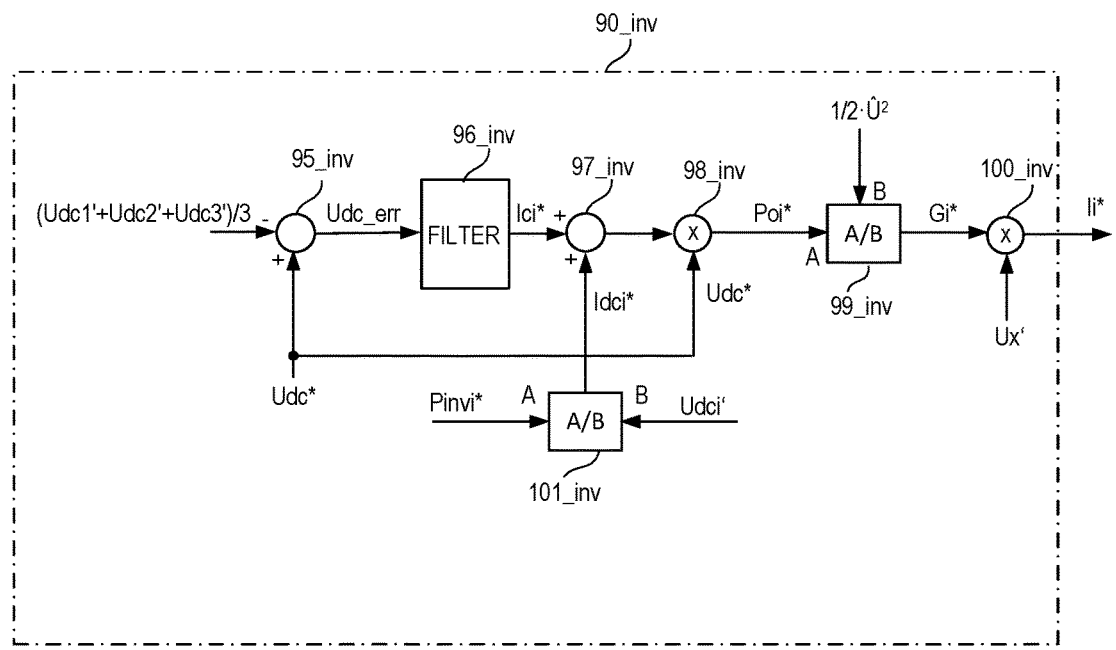
FIG. 31 illustrates on example of a input current reference controller implemented in the controller according to FIG. 30.
Figure 32:
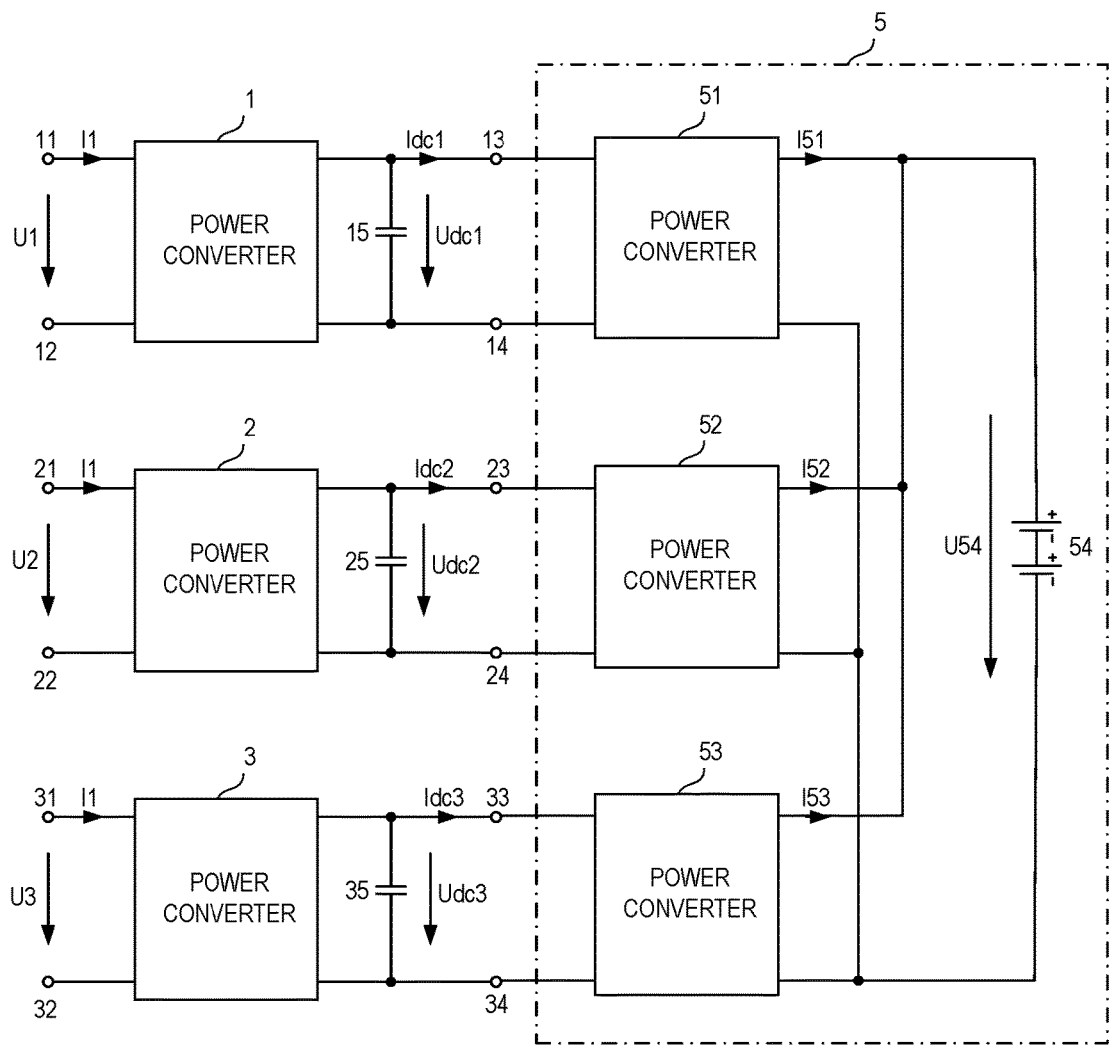
FIG. 32 illustrates one example of the load.

FIG. 31 illustrates one example of the input current reference controller 90_inv. The input current reference controller 90_inv according to FIG. 31 is based on the input current reference controller 90 according to FIG. 27. In the input current reference controller 70_inv according to FIG. 31, same parts as in the input current reference controller 70 according to FIG. 27 have same reference numbers, wherein "_inv" has been added to the reference numbers in FIG. 31.

As can be seen, the topology of the input current reference controller 90_inv according to FIG. 31 is very similar with the topology of the input current reference controller 90 according to FIG. 27. The input current reference controller 90_inv according to FIG. 31 is different from the input current reference controller 90 control circuit according to FIG. 27 only in that adder 97_inv receives a DC current reference Idci* instead of the measured DC current Idci' received by adder 97 in the current reference controller 70 control circuit according to FIG. 27. The DC current reference Idci* defines the current that is to be drawn from the load 5 and, therefore, defines the (average) power that is transferred from the load 5 to the power supply 4.

According to one example, the DC current reference Idci* is provided by a divider 101_inv that receives a power reference Pinvi*, which defines the power that is to be received from the respective power converter i from the load at the respective output nodes i3, i4, and the measured DC voltage Udci' at the respective output nodes i3, i4. In the inverter mode, the DC voltage Udci at the output nodes i3, i4 is defined by the load 5, which includes a battery, for example. Referring to FIG. 31, divider 101_inv divides the power reference Pinvi* by the measured DC voltage Udci' to provide the DC current reference Idci*.

The input current reference controller 90_inv according to FIG. 31, in addition to the input current Idci received from the load 5, also regulates the DC link voltage Udci at the circuit nodes i3, i4 of each converter i to a voltage level as defined by the DC link voltage reference Udc*. This, however, is only an example According to another example, in the rectifier mode, the DC link voltages Udc1, Udc2, Udc3 of the converters 1, 2, 3 are defined by the load, wherein the load 5 may include one or more batteries connected to the output nodes 13, 14, 23, 24, 33, 34 of the converters 1, 2, 3. In this case, the input current reference controller 90_inv according to FIG. 31 may be simplified by omitting subtractor 95_inv, filter 96_inv, adder 97_inv, multiplier 98_inv and divider 101_inv and by providing the power reference Pinvi* (instead of Poi*) to divider 99_inv.

In the inverter mode, the input currents I1, I2, I3 of the converters 1, 2, 3 are adjusted based on the common mode signal Scm (the common mode voltage Unm) in the same way as explained with reference to the inverter mode. The only difference being that the currents I1, I2, I3 flow in the opposite direction, that is, the currents have an opposite sign. Thus, the benefits explained above that result from adjusting the input voltages U1, U2, U3 based on the common mode voltage Unm in the rectifier mode apply to operating the converters 1, 2, 3 in the inverter mode accordingly.

FIG. 31 illustrates one example of a load 5 that may be connected to the power converter arrangement with the three power converters 1, 2, 3. The power converter arrangement may be connected in a star configuration as illustrated in FIG. 5 or in a delta configuration as illustrated in FIG. 22. Referring to FIG. 31 the load 5 may include three further power converters 51, 52, 53, wherein each of these further power converters 51, 52, 53 is connected to the output of a respective one of the power converters 1, 2, 3, so that each of the further power converters 51, 52, 53 receives one of the DC link voltages Udc1, Udc2, Udc3. According to one example, the further power converters 51, 52, 53 are DC-DC converters, wherein outputs of the further power converters 51, 52, 53 are connected in parallel and are each connected to a load 54. According to one example, the load 54 is a battery and the further power converters 51, 52, 53 are configured to charge the battery based on power receive from the power converters 1, 2, 3. In this example, each of the further power converters 51, 52, 53 may operate as a current source, wherein the voltage U54 at the outputs of the further power converters 51, 52, 53 is given by the battery 54. The DC-DC converters may be isolated DC-DC converters. That is, each of the DC-DC converters may include a transformer that galvanically isolates the input from the output of the respective DC-DC converter.

Some of the aspects explained above are summarized in the following by way of numbered examples.

Example 1. A method, including: coupling three power converters with each other; connecting each of the three power converters to a 3-phase power source configured to provide three supply voltages; and regulating a respective input signal of each of the three power converters dependent on a common mode signal.

Example 2. The method of example 1, wherein the common mode signal has a frequency that is dependent on a frequency of one of the three supply voltages, and wherein the common mode signal has a phase that is dependent on a phase of one of the three supply voltages.

Example 3. The method according to example 1 or 2, wherein each of the three power converters includes a first input node and a second input node, wherein coupling the three power converters includes connecting the second input nodes of the three power converters with each other at a floating circuit node, wherein connecting each of the three power converters to the 3-phase power source includes connecting the first input node of each of the three power converters to the 3-phase power source, and wherein the input signal is an input voltage of the respective power converter.

Example 4. The method according to example 1 or 2, wherein each of the three power converters includes a first input node and a second input node, wherein coupling the three power converters includes connecting the first input node of each of the three power converters to the second input node of another one of the three power converters, wherein connecting each of the three power converters to the 3-phase power source includes connecting the first input node of each of the three power converters to the 3-phase power source, and wherein the input signal is an input current of the respective power converter.

Example 5. The method of any one of the preceding examples, wherein the common mode signal includes at least a signal portion that is dependent on a third harmonic of a first one of the supply voltages.

Example 6. The method of example 6, wherein the signal portion is proportional to the third harmonic of the first supply voltage.

Example 7. The method of example 6, wherein the signal portion is proportional to a phase shifted version of the third harmonic of the first supply voltage.

Example 8. The method of any one of examples 1 to 7, wherein the method further includes: connecting each of the three power converters to a load; and operating each of the power converters in a rectifier mode in which power is transferred from the 3-phase power supply to the load.

Example 9. The method of any one of examples 1 to 7, wherein the method further includes: connecting each of the three power converters to a load; and operating each of the power converters in an inverter mode in which power is transferred from the load to the 3-phase power supply.

Example 10. The method of any one of the preceding claims, further including regulating an output voltage of each of the power converters.

Example 11. The method of any one of the preceding examples, wherein each of the power converters includes an inductor and a switching circuit with at least one electronic switch.

Example 12. The method of example 11, wherein the inductor and the switching circuit form a Totem Pole topology.

Example 13. The method of example 12, wherein regulating the respective input signal of each of the three power converters dependent on the common mode signal includes regulating a voltage across the inductor dependent on the common mode signal.

Example 14. The method of example 13, wherein regulating the voltage across the inductor includes a switched-mode operation of the switching circuit dependent on a duty-cycle signal, and wherein the duty-cycle signal is generated to be dependent on the common mode signal.

Example 15. A control circuit configured to regulate a respective input signal of each of three power converters dependent on a common mode signal, wherein the three power converters are coupled with each other, and wherein each of the three power converters is connected to a 3-phase power source configured to provide three supply voltages.

Example 16. A power converter arrangement including: a control circuit according to example 15, and three power converters that are coupled with each other and that are each connected to a 3-phase power source configured to provide three supply voltages.

Example 17. The power converter arrangement of claim 16, further comprising: a load connected to an output of each of the power converters.

Example 18. The power converter arrangement of claim 17, wherein the load includes: three further power converters each having an input connected to an output of a respective one of the power converters and an output, and a battery connected to the output of each of the further power converters.

Example 19. The power converter arrangement of claim 17, wherein each of the further power converters is a DC-DC converter.

The invention claimed is:
1. A method comprising:
coupling three power converters to each other;
connecting each of the three power converters to a 3-phase power supply, the 3-phase power supply operative to output three supply voltages;
receiving a signal; and
regulating a respective input voltage inputted to each of the three power converters dependent on the received signal;
wherein the received signal is periodic and has a frequency that is dependent on a frequency of a first input voltage of three input voltages outputted from the 3-phase power supply to the three power converters; and
wherein the received signal has a phase that is dependent on a phase of the first input voltage outputted from the 3-phase power supply;
wherein a magnitude of the received signal varies over time;
wherein the three power converters are coupled to each other via a first node; and
wherein the received signal is a common mode voltage setting used to control a magnitude of a common mode voltage between the first node and a second node, the second node being a node of the 3-phase power supply.

2. The method as in claim 1, wherein each of the three power converters comprises a first input node and a second input node;

wherein coupling the three power converters comprises connecting the second input nodes of the three power converters with each other at a floating circuit node;

wherein connecting each of the three power converters to the 3-phase power source comprises connecting the first input node of each of the three power converters to the 3-phase power supply.

3. The method as in claim 1, wherein each of the three power converters comprises a first input node and a second input node;

wherein coupling the three power converters comprises connecting the first input node of each of the three power converters to the second input node of another one of the three power converters; and wherein connecting each of the three power converters to the 3-phase power supply comprises connecting the first input node of each of the three power converters to the 3-phase power supply.

4. The method as in claim 1 further comprising:
connecting each of the three power converters to a load; and
operating each of the power converters in a rectifier mode in which power is transferred from the 3-phase power supply through the three power converters to the load.

5. The method as in claim 1 further comprising:
connecting each of the three power converters to a load; and
operating each of the three power converters in an inverter mode in which power is transferred from the load to the 3-phase power supply.

6. The method as in claim 1, wherein the received signal includes at least a signal portion that is dependent on a third harmonic of the first supply voltage.

7. The method as in claim 6, wherein the signal portion is proportional to the third harmonic of the first supply voltage.

8. The method such as in claim 7, wherein the signal portion is proportional to a phase shifted version of the third harmonic of the first supply voltage.

9. The method as in claim 1, wherein each of the three power converters comprises an inductor and a switching circuit with at least one electronic switch.

10. The method as in claim 9, wherein the inductor and the switching circuit form a Totem Pole topology.

11. The method as in claim 10, wherein regulating the respective supply input voltage of each of the three power converters dependent on the signal comprises:
regulating a voltage across the inductor dependent on the received signal.

12. The method as in claim 11, wherein regulating the voltage across the inductor comprises a switched-mode operation of the switching circuit dependent on a duty-cycle signal; and
wherein the duty-cycle signal is generated to be dependent on the received signal.

13. The system as in claim 1, wherein the three power converters include a first power converter, a second power converter, and a third power converter;
wherein the 3-phase power supply outputs a first input voltage from a first power source of the 3-phase power supply to the first power converter, the first input voltage being a first input signal supplied from the 3-phase power supply to the first power converter;
wherein the 3-phase power supply outputs a second input voltage from a second power source of the 3-phase power supply to the second power converter, the second input voltage being a second input signal supplied from the 3-phase power supply to the second power converter; and
wherein the 3-phase power supply outputs a third input voltage from a third power source of the 3-phase power supply to the third power converter, the third power input voltage being a third input signal supplied from the 3-phase power supply to the third power converter.

14. The system as in claim 13, wherein each of the three power converters are connected to a first node;
wherein a combination of the first power source, the second power source, and the third power source are directly connected to a second node;
wherein regulating the respective input voltage of each of the three power converters includes:
adjusting the first input voltage, the second input voltage, and the third input voltage based on the magnitude of a voltage between the first node and the second node.

15. The system as in claim 14, wherein regulating the respective input voltage of each of the three power converters includes:
adjusting the first supply voltage, the second supply voltage, and the third supply voltage such that the voltage between the first node and the second node is equal to the received signal.

16. The system as in claim 1, wherein the received signal indicates a desired setting of the common mode voltage.

17. The system as in claim 16,
wherein each of multiple power sources in the 3-phase power supply producing the respective input voltage to each of the three power converters is referenced with respect to the second node; and
wherein regulating the respective input voltage includes adjusting the respective input voltage to each of the three power converters to maintain a magnitude of the common mode voltage to a desired setting as indicated by the common mode voltage setting.

18. A system comprising:
a controller;
multiple power converters including a first power converter, a second power converter, and a third power converter;
wherein each of the first power converter, the second power converter, and the third power converter are directly connected to a first node;
wherein a power supply supplies a respective power supply input to each of the multiple power converters; and
wherein the controller is operative to adjust each respective power supply input based on a received input signal, a magnitude of the received input signal varying over time, adjustment of each respective power supply input based on the received input signal being operative to regulate a common mode voltage between the first node and a second node, the second node being a node of the power supply.

19. The system as in claim 18, wherein the first node is a floating circuit node; and
wherein the second node is a common mode voltage node of the power supply.

20. The system as in claim 18, wherein the respective power supply input to each of the multiple power converters includes:
a first power supply input supplied from a first power source of the power supply to the first power converter;

a second power supply input supplied from a second power source of the power supply to the second power converter; and a third power supply input supplied from a third power source of the power supply to the third power converter.

21. The system as in claim 20, wherein the adjustment of each respective power input based on the received input signal includes: generation of an error signal based on the received input signal.

22. The system as in claim 21, wherein the adjustment of each respective power supply input based on the received input signal includes: use of the error signal to regulate the common mode voltage between the first node and the second node.

23. The system as in claim 18, wherein the first node is a floating circuit node; and wherein the second node is a common mode voltage node; and wherein the respective power supply input to each of the multiple power converters includes: i) a first power supply input supplied from a first power source of the power supply to the first power converter; ii) a second power supply input supplied from a second power source of the power supply to the second power converter; and iii) a third power supply input supplied from a third power source of the power supply to the third power converter.

24. The system as in claim 23, wherein the adjustment of each respective power input based on the received input signal includes: i) generation of an error signal based on the received input signal, and ii) use of the error signal to regulate the common mode voltage between the first node of the second node.

25. The method as in claim 18, wherein the received signal has a non-zero frequency that is dependent on a frequency of a first power supply input supplied from the power supply to the first power converter.

26. The method as in claim 25, wherein the received input signal has a phase that is dependent on a phase of the first power supply input supplied from the power supply to the first power converter.

27. A method comprising:

coupling three power converters with each other;

connecting each of the three power converters to a 3-phase power source, the 3-phase power source configured to provide three supply voltages;

receiving a common mode signal, a magnitude of the common mode signal varying over time;

regulating a respective input signal of each of the three power converters dependent on the common mode signal;

wherein each of the three power converters is a PFC (Power Factor Correction) converter;

wherein the common mode signal is generated to have a frequency that is dependent on a frequency of one of the three supply voltages and to have a phase that is dependent on a phase of one of the three supply voltages;

wherein each of the three power converters comprises a first input node and a second input node;

wherein coupling the three power converters comprises connecting the second input nodes of the three power converters with each other at a floating circuit node;

wherein connecting each of the three power converters to the 3-phase power source comprises connecting the first input node of each of the three power converters to the 3-phase power source;

wherein the input signal is an input voltage of the respective power converter; and wherein the common mode signal (Scm) includes at least a signal portion that is dependent on a third harmonic of a first one of the three supply voltages.

28. A method comprising:

coupling three power converters with each other;

connecting each of the three power converters to a 3-phase power source configured to provide three supply voltages;

receiving a common mode signal (Scm), a magnitude of the common mode signal varying over time;

regulating a respective input signal of each of the three power converters dependent on a common mode signal (Scm);

wherein each of the three power converters is a PFC power converter;

wherein the common mode signal (Scm) is generated at a frequency that is dependent on a frequency of one of the three supply voltages, the common mode signal (Scm) generated to have a phase that is dependent on a phase of one of the three supply voltages;

wherein each of the three power converters comprises a first input node and a second input node;

wherein coupling the three power converters comprises connecting the first input node of each of the three power converters to the second input node of another one of the three power converters;

wherein connecting each of the three power converters to the 3-phase power source comprises connecting the first input node of each of the three power converters to the 3-phase power source;

wherein the respective input signal is a respective input current to the respective power converter; and wherein the common mode signal (Scm) includes at least a signal portion that is dependent on a third harmonic of a first one of the three supply voltages.

* * * * *